(12) United States Patent
Sofka

(10) Patent No.: US 12,372,769 B2
(45) Date of Patent: Jul. 29, 2025

(54) ADJUSTABLE MOUNTING APPARATUS

(71) Applicant: Beckman Coulter, Inc., Brea, CA (US)

(72) Inventor: Jozef Sofka, Redwood City, CA (US)

(73) Assignee: Beckman Coulter, Inc., Brea, CA (US)

( * ) Notice: Subject to any disclaimer, the term of this patent is extended or adjusted under 35 U.S.C. 154(b) by 0 days.

(21) Appl. No.: 18/610,953

(22) Filed: Mar. 20, 2024

(65) Prior Publication Data

US 2024/0272414 A1 Aug. 15, 2024

Related U.S. Application Data

(63) Continuation of application No. PCT/US2022/043867, filed on Sep. 16, 2022.
(Continued)

(51) Int. Cl.
| | |
|---|---|
| *G02B 21/26* | (2006.01) |
| *G02B 7/00* | (2021.01) |
| *G02B 21/32* | (2006.01) |

(52) U.S. Cl.
CPC ............. *G02B 21/26* (2013.01); *G02B 7/003* (2013.01); *G02B 21/32* (2013.01)

(58) Field of Classification Search
CPC ........ G02B 21/26; G02B 21/32; G02B 7/003; F16M 13/00; F16M 13/022; F16M 13/005; F16M 2200/00
(Continued)

(56) References Cited

U.S. PATENT DOCUMENTS

| | | |
|---|---|---|
| 3,826,558 A | 7/1974 | Rasberry et al. |
| 5,194,993 A | 3/1993 | Bedzyk |

(Continued)

FOREIGN PATENT DOCUMENTS

| | | |
|---|---|---|
| CA | 3022894 A1 | 10/2020 |
| CN | 102956523 A | 3/2013 |

(Continued)

OTHER PUBLICATIONS

International Search Report, Written Opinion for PCT/US22/43867 filed on Sep. 16, 2022, 11 pages.
(Continued)

*Primary Examiner* — Wyatt A Stoffa
*Assistant Examiner* — Mitchell T Oestreich
(74) *Attorney, Agent, or Firm* — FROST BROWN TODD LLP

(57) ABSTRACT

The presently claimed and described technology provides an apparatus (500, 1000A, 1000B) configured to adjustably position a focal location (14) of a first instrument (12) of a first body (10, 20, 60) with respect to a target location (44, 54) of a second instrument (42, 42H, 42U, 52) of a second body (40, 50). The apparatus further includes a third body (30), a first joint (210), and a second joint (310). The first joint is configured to adjustably linearly position the first body with respect to the third body along a first axis (A2) and thereby perform a first adjustment and is further configured to adjustably rotatably position the first body with respect to the third body about the first axis (A2) and thereby perform a second adjustment. The second joint is configured to adjustably linearly position the second body with respect to the third body along a second axis (A3) and thereby perform a third adjustment and further configured to adjustably rotatably position the second body with respect to the third body about the second axis (A3) and thereby perform a fourth adjustment. Each of the first, second, third, and/or fourth adjustments are performed independently of each other and may have zero backlash. Additional third axis (A1, A1A, A1B) linear and/or rotational adjustment mechanism(s) may be added. In certain embodiments, the first, second, and/or third axes intersect each other at a point (P).

17 Claims, 25 Drawing Sheets

Related U.S. Application Data

(60) Provisional application No. 63/249,018, filed on Sep. 27, 2021.

(58) Field of Classification Search
USPC .......................................................... 359/391
See application file for complete search history.

(56) References Cited

U.S. PATENT DOCUMENTS

| | | |
|---|---|---|
| 5,530,547 A | 6/1996 | Arnold |
| 5,847,885 A | 12/1998 | Arnone et al. |
| 6,174,102 B1 | 1/2001 | Do et al. |
| 6,198,580 B1 | 3/2001 | Dallakian |
| 6,266,196 B1 | 7/2001 | Do et al. |
| 6,442,858 B1 | 9/2002 | Asano |
| 6,534,763 B2 | 3/2003 | Krohn et al. |
| 6,781,753 B2 | 8/2004 | Gunderson |
| 6,813,023 B2 | 11/2004 | Shekel et al. |
| 7,180,662 B2 | 2/2007 | Rondeau et al. |
| 7,417,714 B2 | 8/2008 | Binnard et al. |
| 7,474,419 B2 | 1/2009 | Tappel et al. |
| 7,688,528 B2 | 3/2010 | Michael et al. |
| 7,732,985 B2 | 6/2010 | Choi et al. |
| 8,031,417 B1 | 10/2011 | Halpin |
| 8,410,414 B2 | 4/2013 | Wu et al. |
| 8,492,693 B2 | 7/2013 | Brooker |
| 8,893,627 B2 | 11/2014 | Hwu et al. |
| 9,575,308 B2 | 2/2017 | Dixon et al. |
| 9,977,230 B2 | 5/2018 | Yuri |
| 10,220,386 B2 | 3/2019 | Williamson et al. |
| 10,527,836 B2 | 1/2020 | Sakamoto et al. |
| 10,578,851 B2 | 3/2020 | Fletcher et al. |
| 10,634,897 B2 | 4/2020 | Sakamoto et al. |
| 10,725,309 B2 | 7/2020 | Sakamoto et al. |
| 10,746,980 B2 | 8/2020 | Kenny et al. |
| 10,838,187 B2 | 11/2020 | Sakamoto et al. |
| 10,928,620 B2 | 2/2021 | Sakamoto et al. |
| 11,009,693 B2 | 5/2021 | Sakamoto et al. |
| 11,061,215 B2 | 7/2021 | Yamada |
| 11,112,952 B2 | 9/2021 | Ward et al. |
| 11,117,130 B2 | 9/2021 | Williamson et al. |
| 2014/0085205 A1 | 3/2014 | Kim |
| 2014/0232846 A1 | 8/2014 | Tanaka |
| 2015/0022651 A1 | 1/2015 | Wu |
| 2016/0069506 A1 | 3/2016 | Shelef et al. |
| 2018/0156713 A1 | 6/2018 | Berezhna et al. |
| 2018/0314049 A1 | 11/2018 | Yamada |
| 2018/0373015 A1 | 12/2018 | Sakamoto et al. |
| 2020/0080926 A1* | 3/2020 | Wanders ............ G01N 15/1434 |
| 2021/0033840 A1 | 2/2021 | Roggenbuck et al. |

FOREIGN PATENT DOCUMENTS

| | | |
|---|---|---|
| CN | 109490178 A1 | 3/2019 |
| CN | 113189764 A | 7/2021 |
| EP | 2876476 A1 | 4/2017 |
| EP | 3208646 A1 | 7/2019 |
| EP | 3757648 A1 | 8/2023 |
| JP | S60 107613 A | 6/1985 |
| JP | S61 140837 A | 6/1986 |
| JP | H10 188871 A | 7/1998 |
| JP | 2019 204009 A2 | 11/2019 |
| KR | 101234343 B1 | 3/2013 |

OTHER PUBLICATIONS

Holmarc; "4-Axis Stages", Web Page <https://www.holmarc.com/pdf/4_Positioning_Devices.pdf>, retrieved from the internet on Mar. 20, 2024, 81 pages.

"Newport; Stage Components Considerations", Web Page <https://www.newport.com/n/stage-components-considerations>, retrieved from the internet on Mar. 20, 2024, 14 pages.

Thorlabs; "4-axis MicroBlock Stages"; Web Page <https://www.thorlabs.com/newgrouppage9.cfm?objectgroup_id=1042>, retrieved from the internet on Mar. 20, 2024, 3 pages.

"Youtube video about Manual Tilting Stage", www.youtube.com, "https://www.youtube.com/watch?v=Ikn34UJ1TNI".

"Youtube video about X, Y Linear Micrometer Stage", www.youtube.com, "https://www.youtube.com/watch?v=7o88YswdwcM".

* cited by examiner

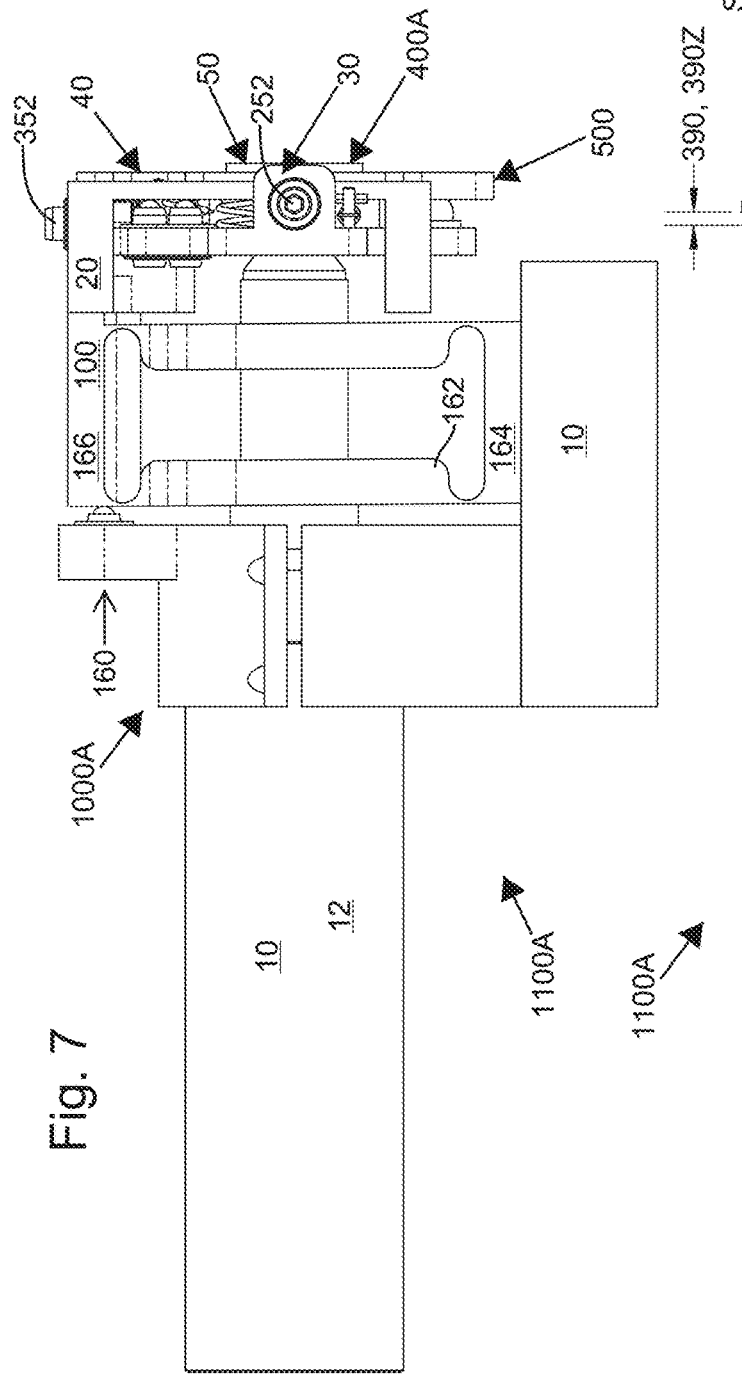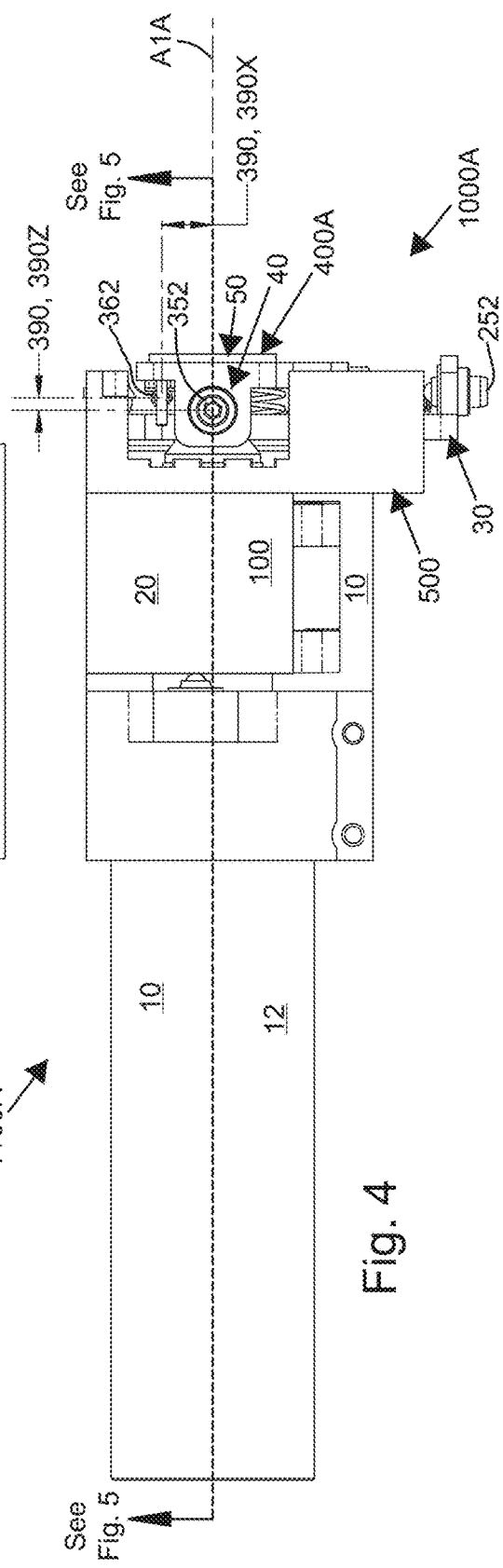

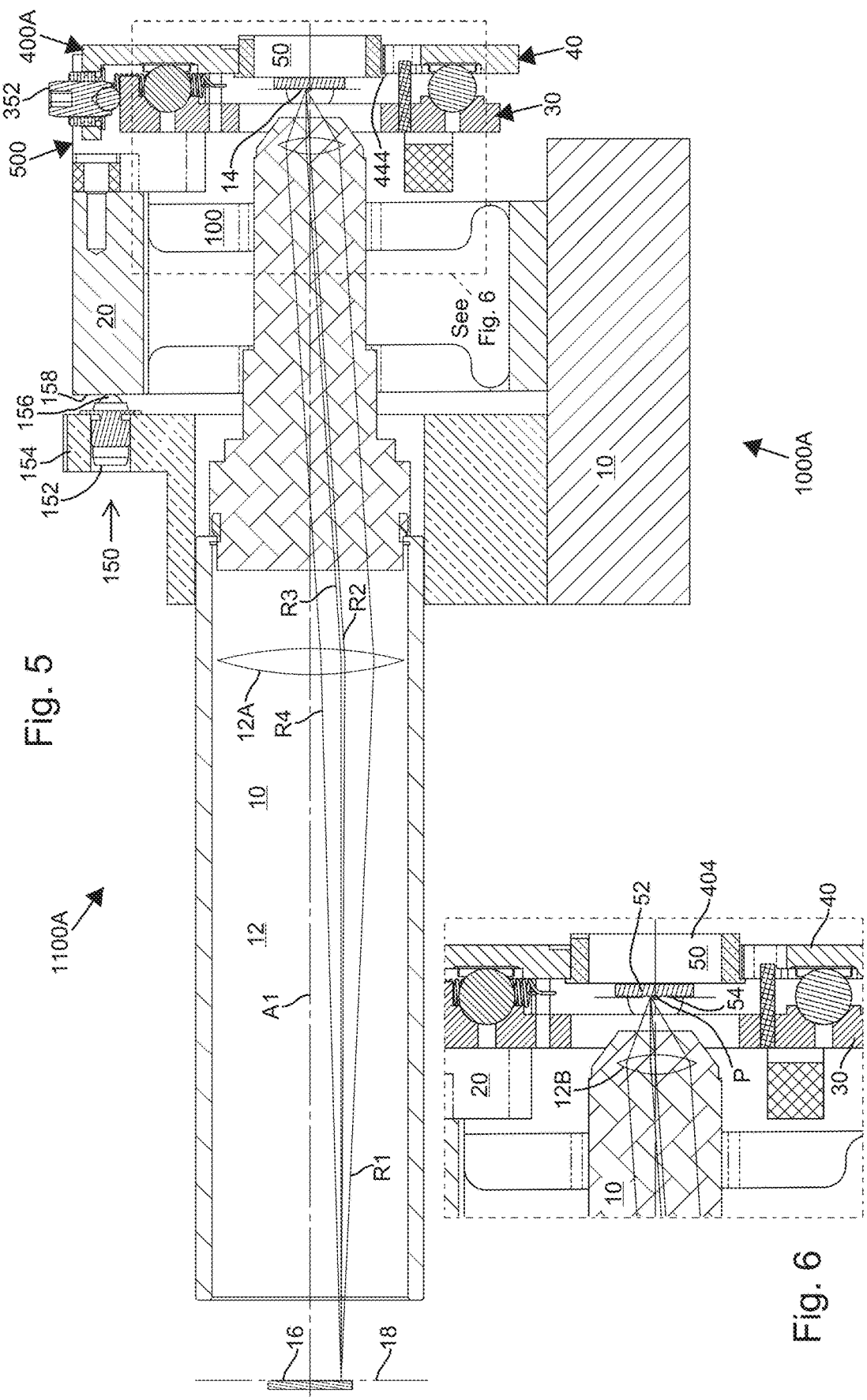

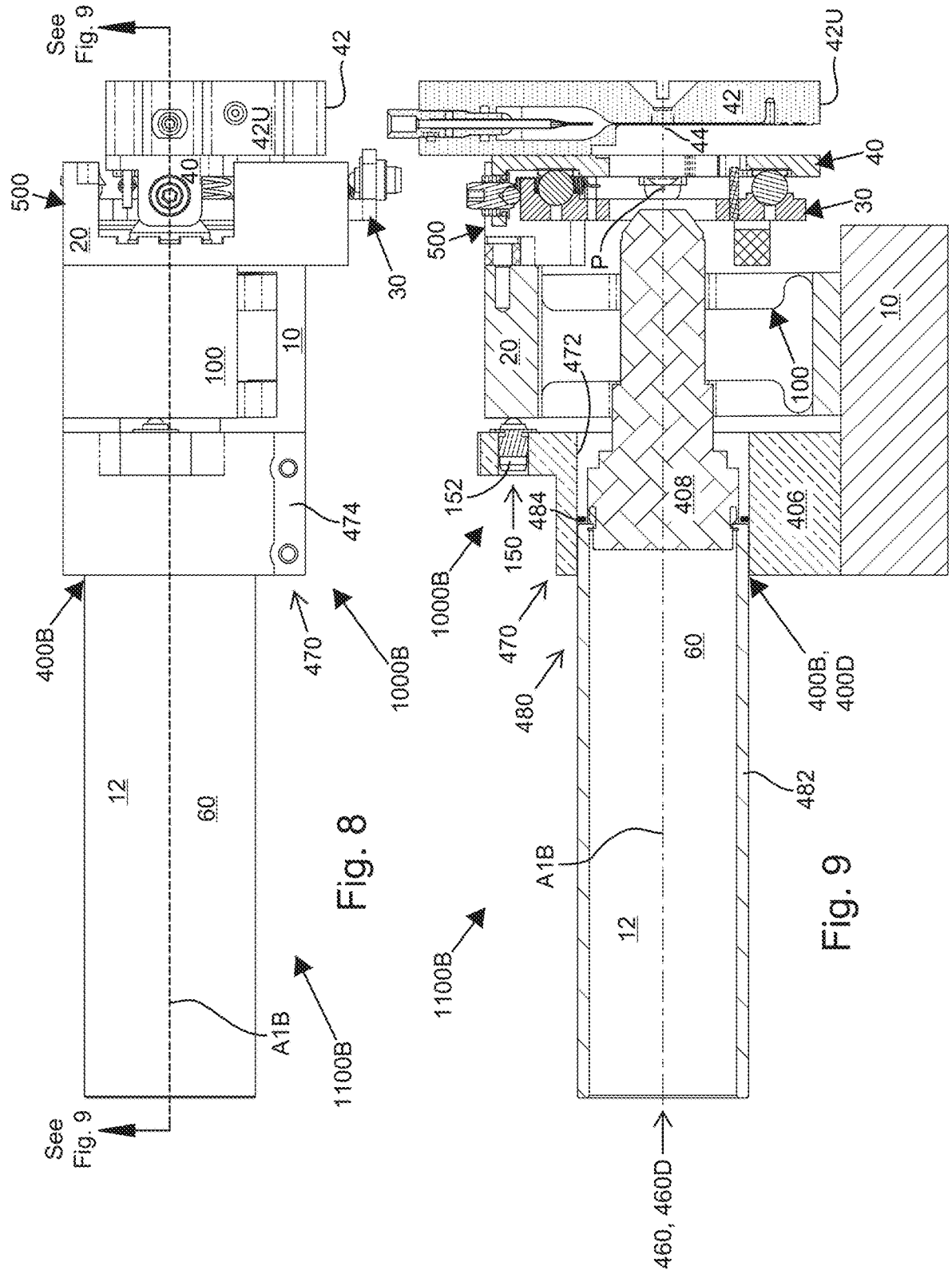

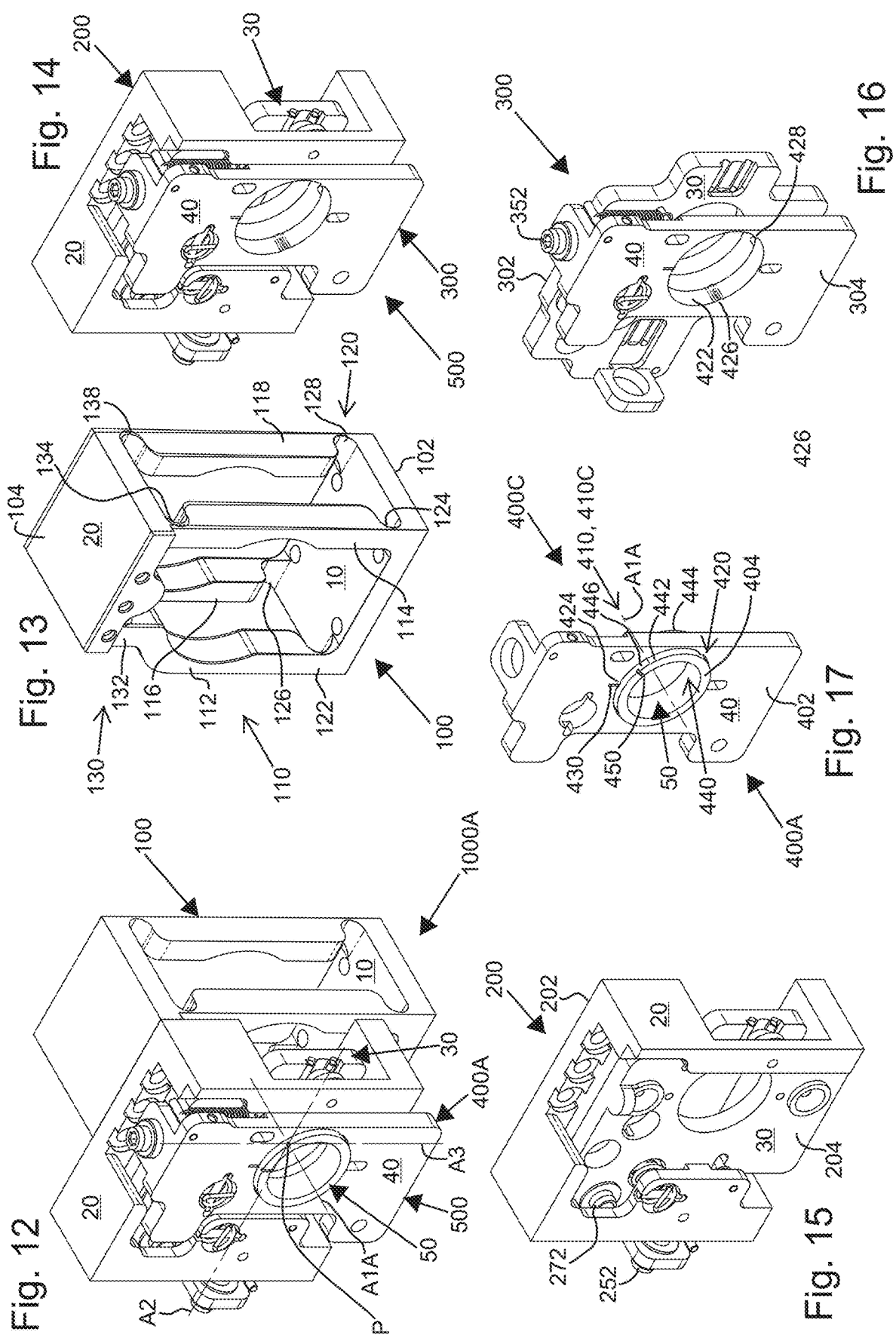

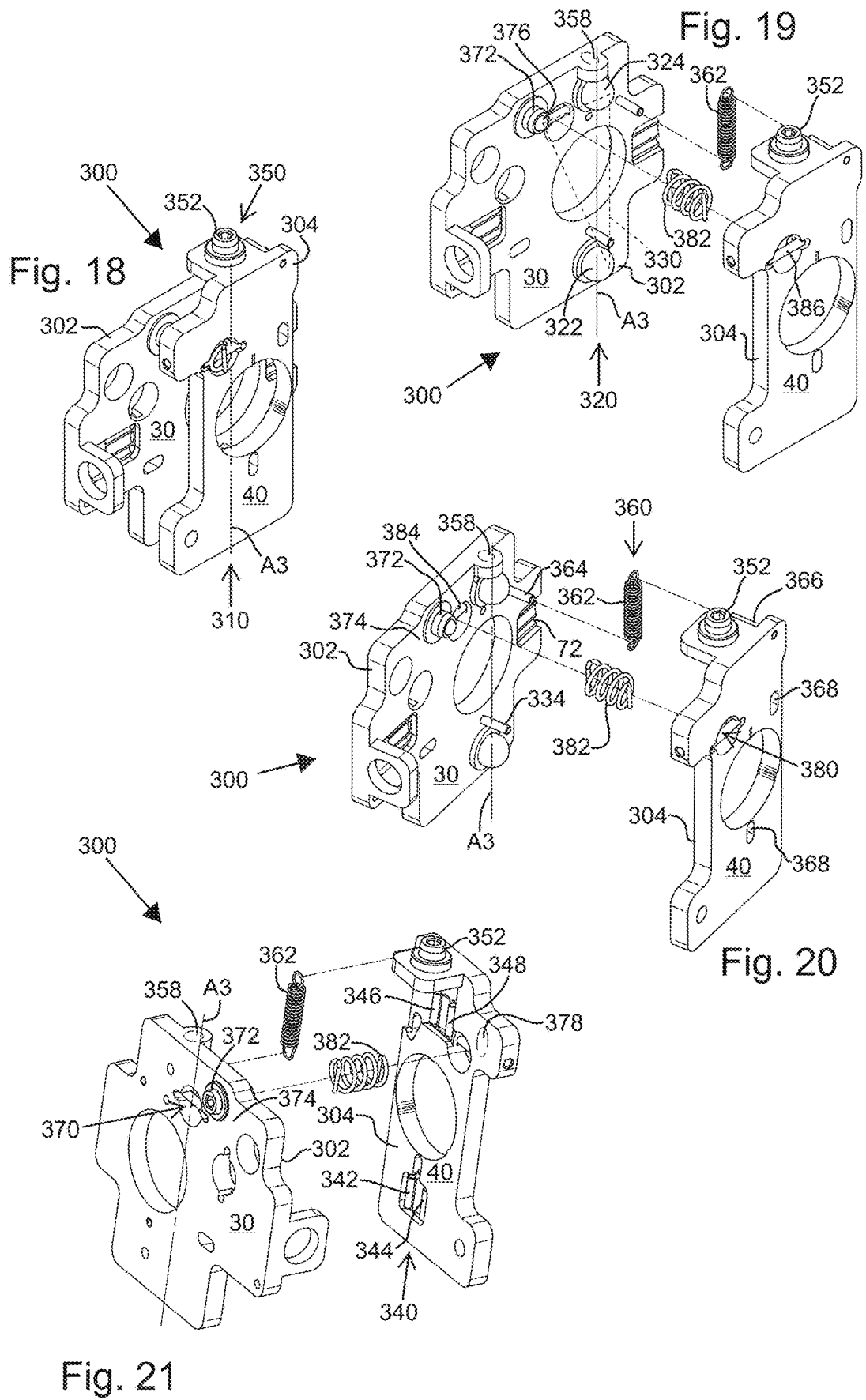

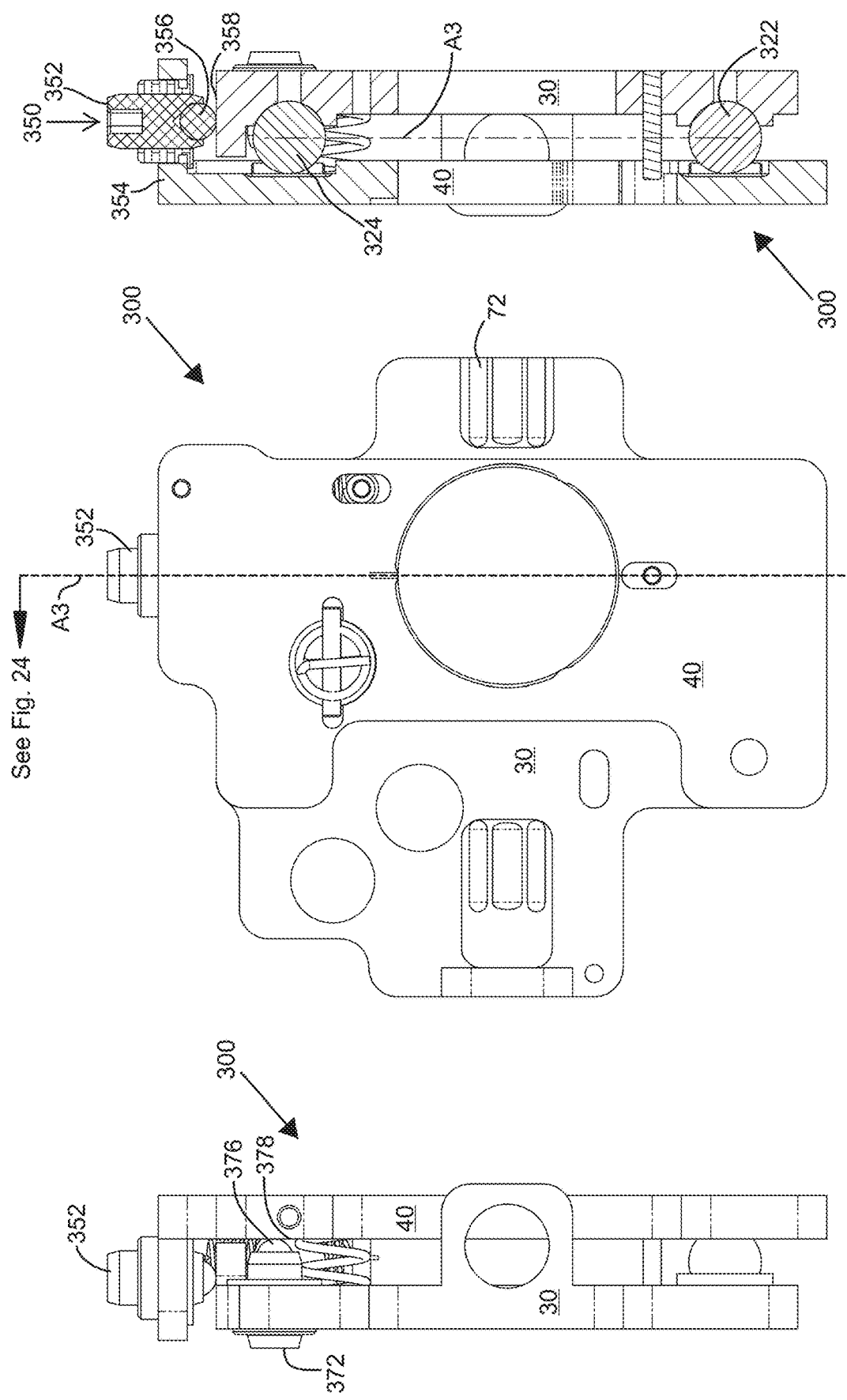

Fig. 27
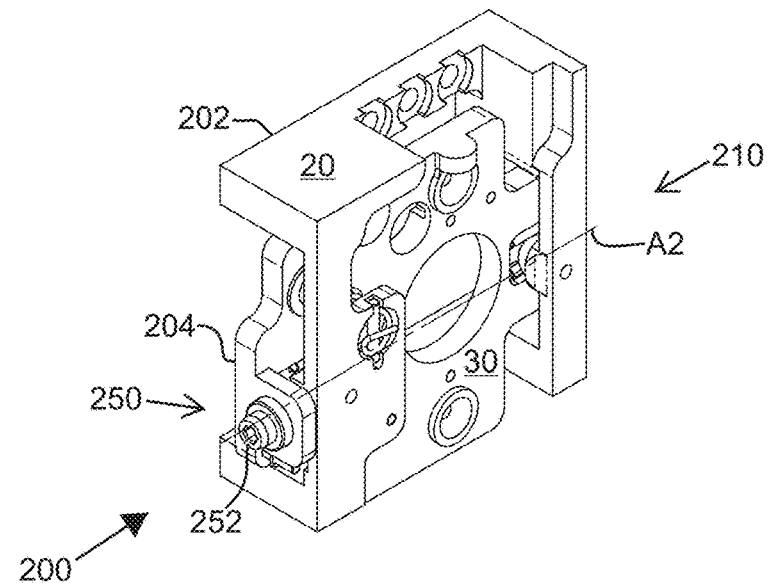
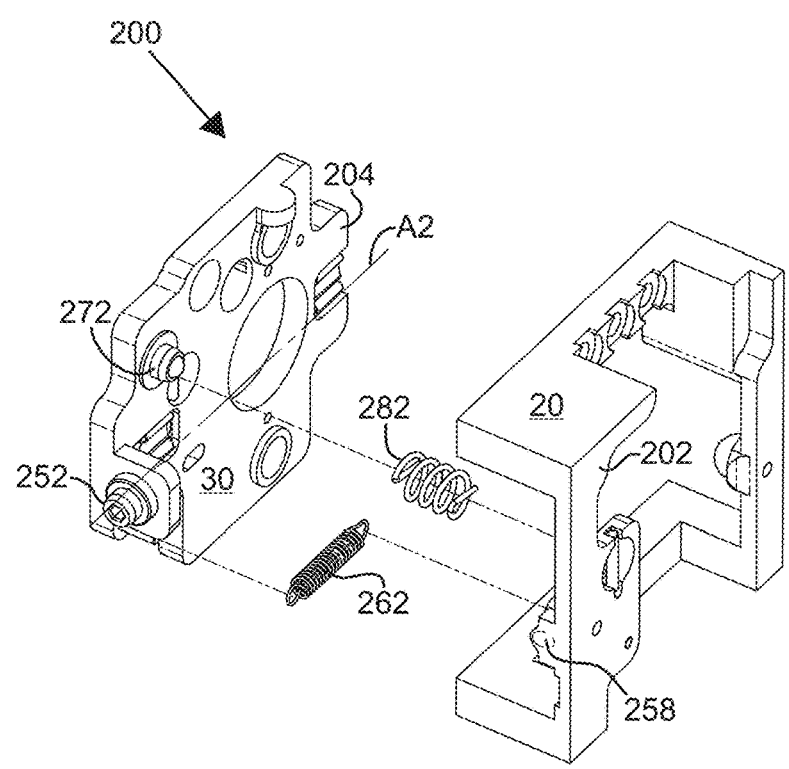
Fig. 28

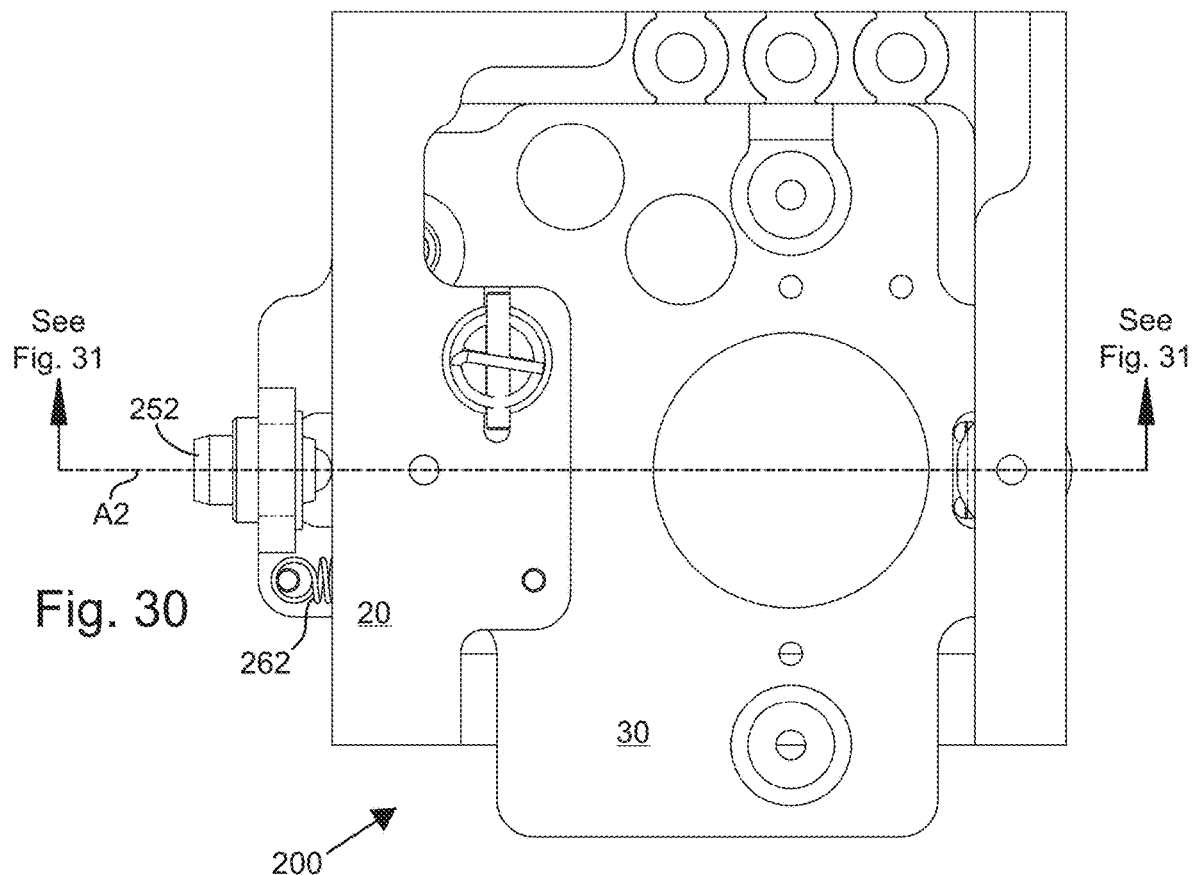
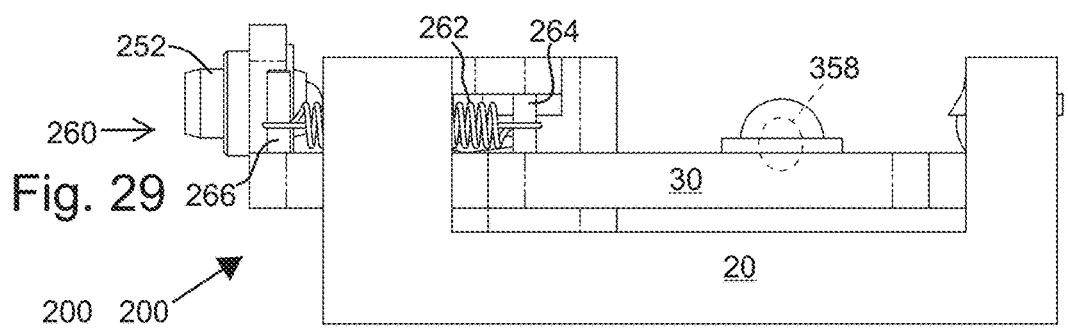
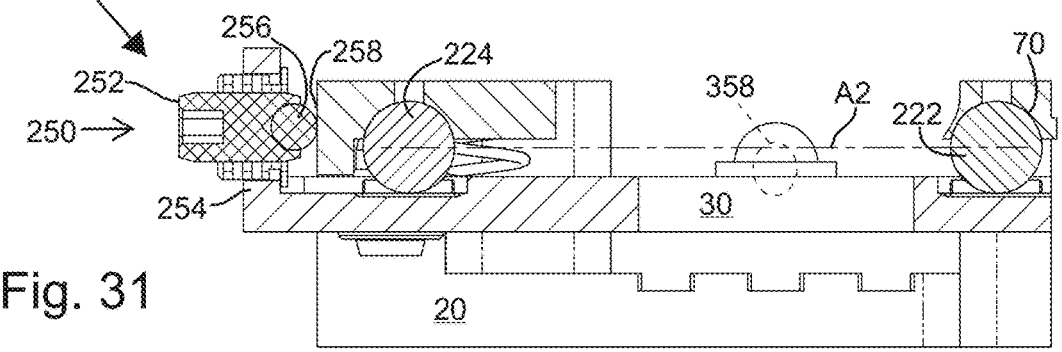

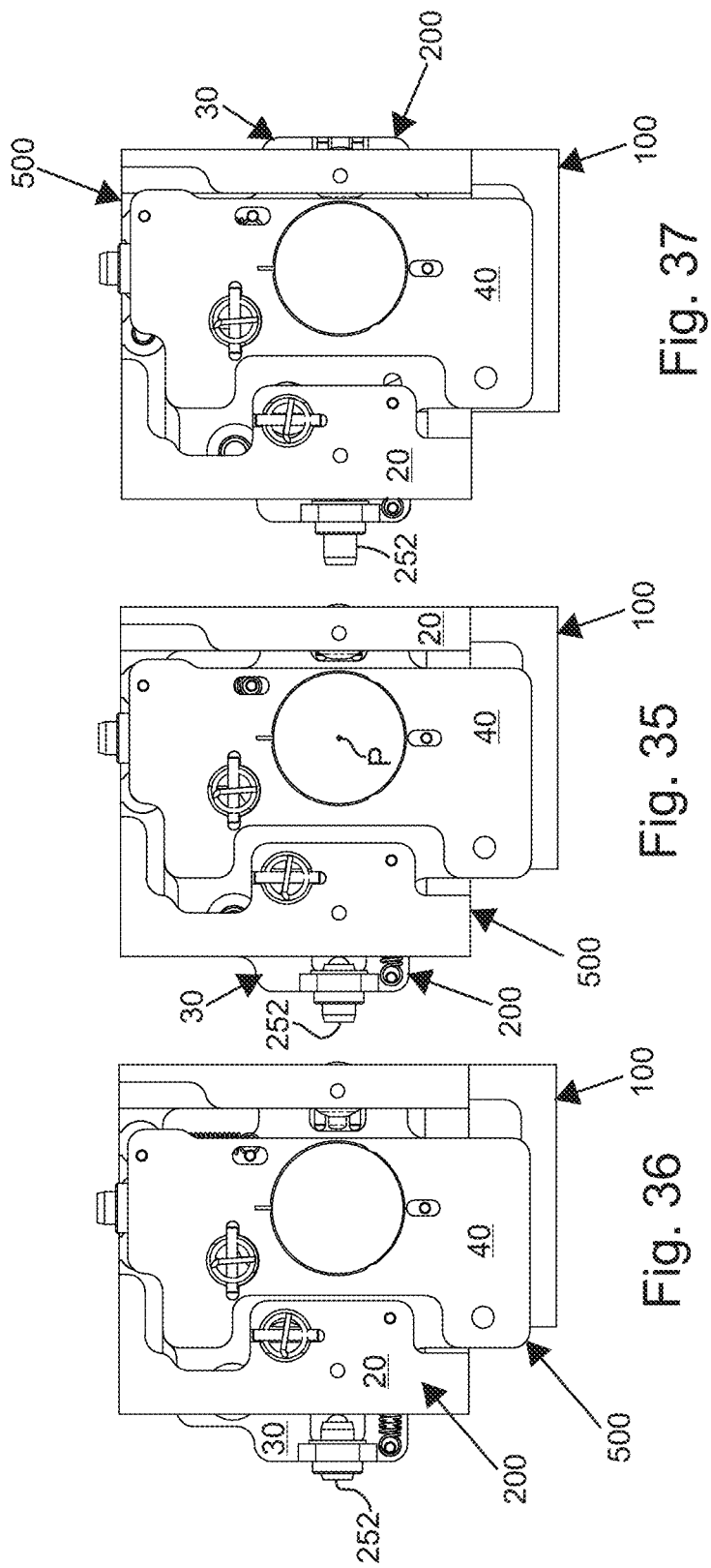

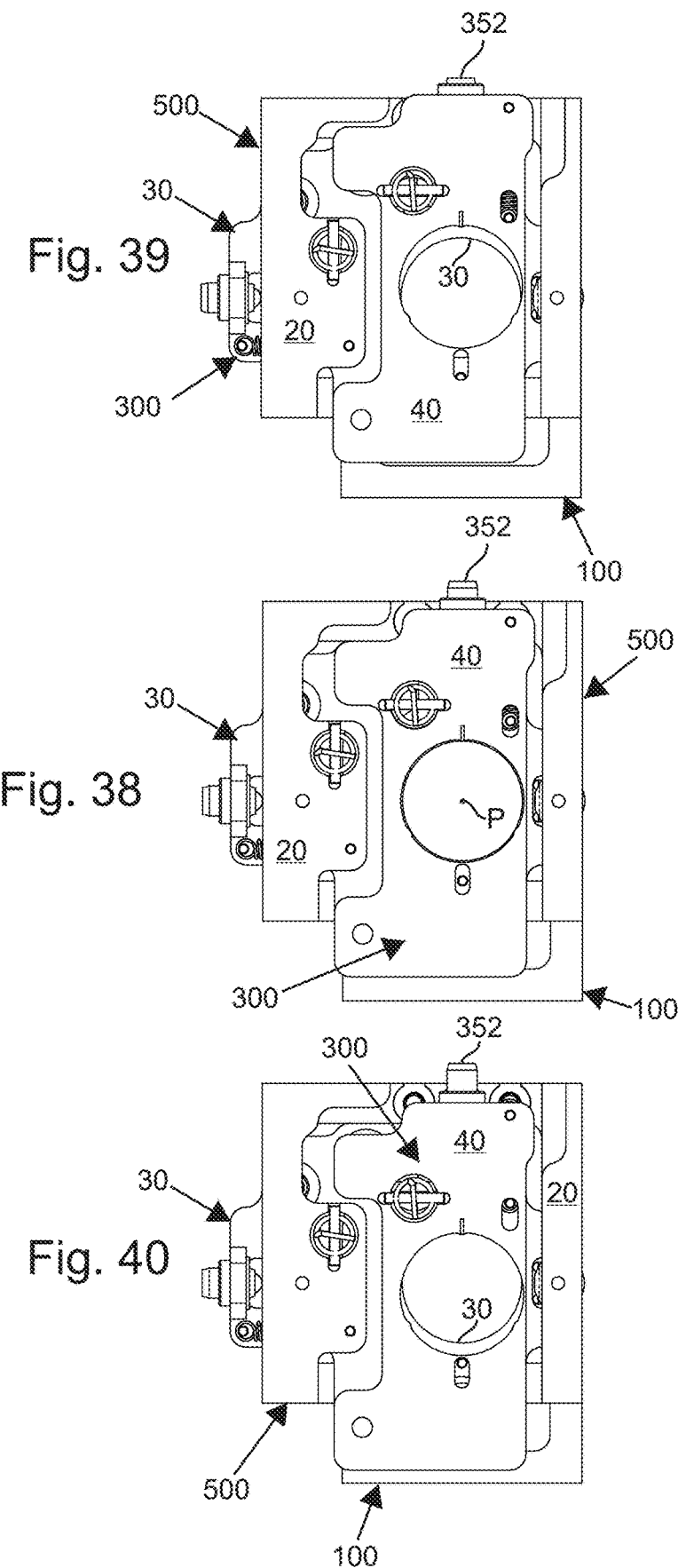

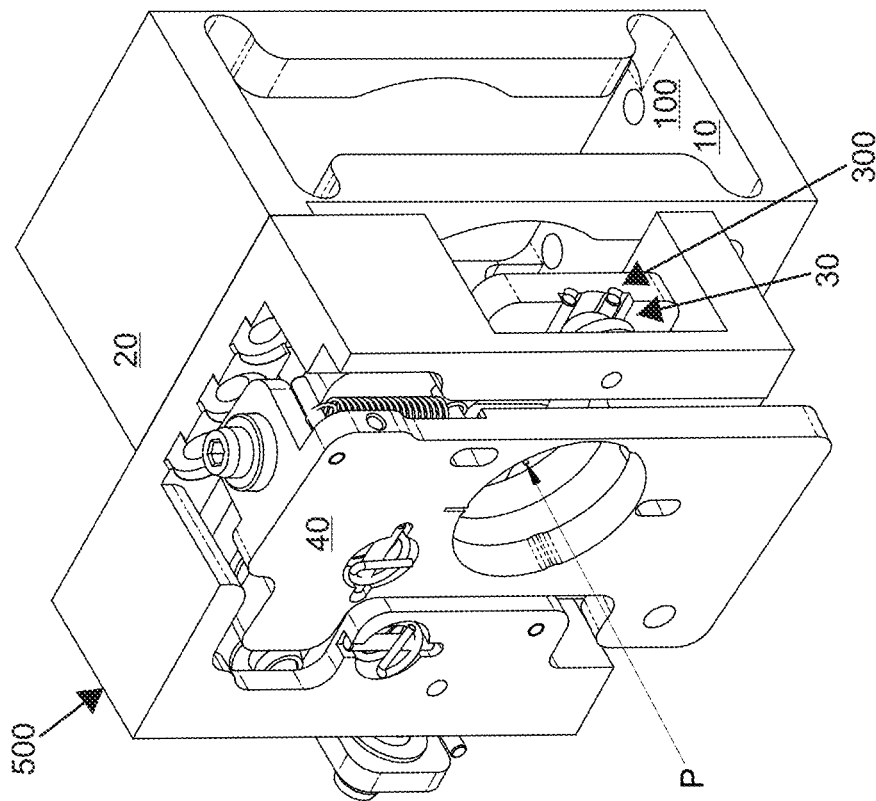
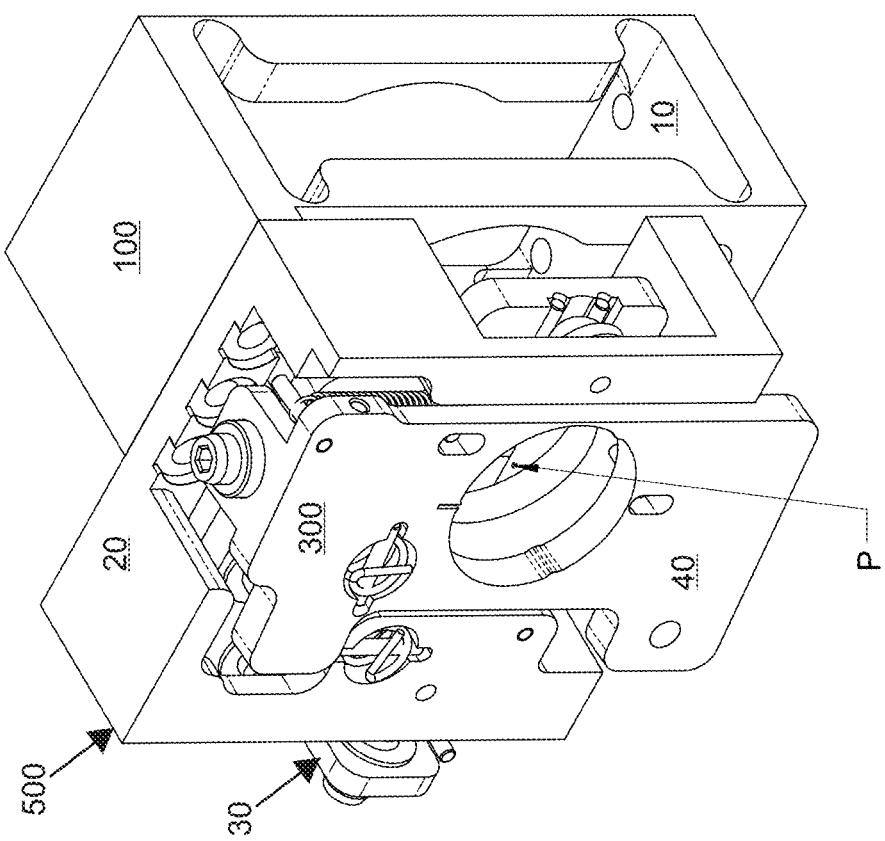

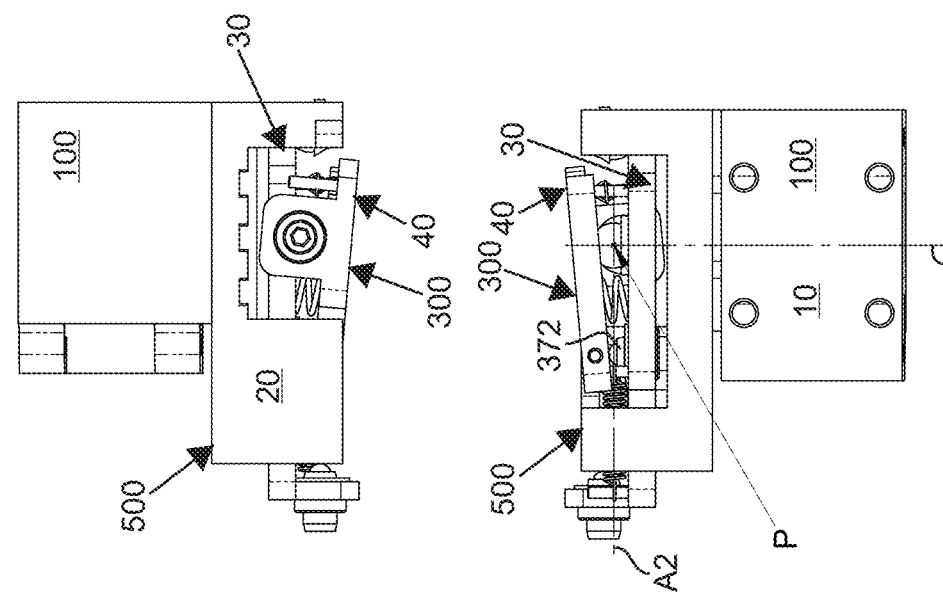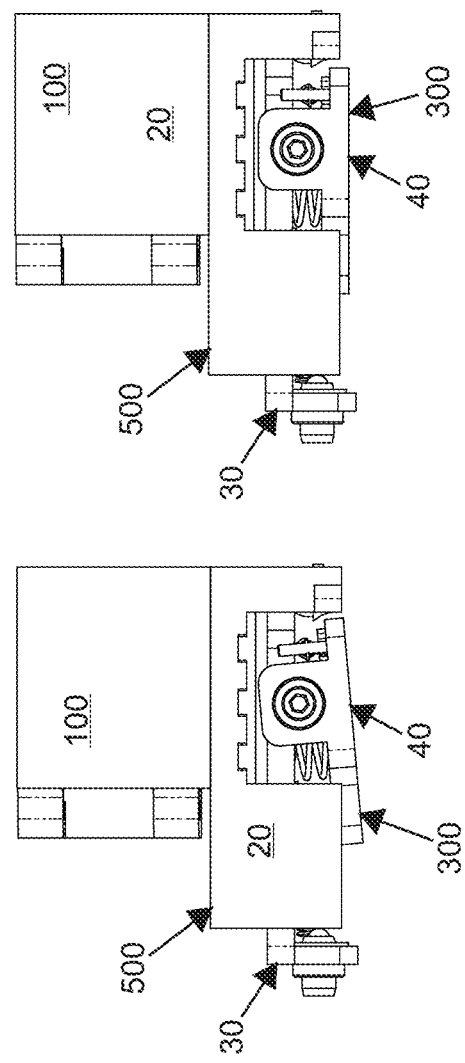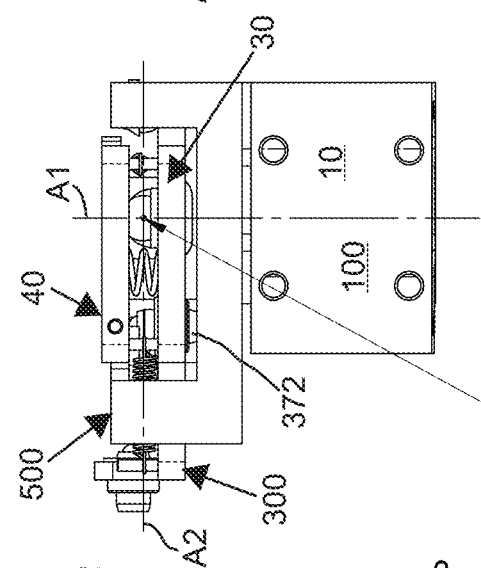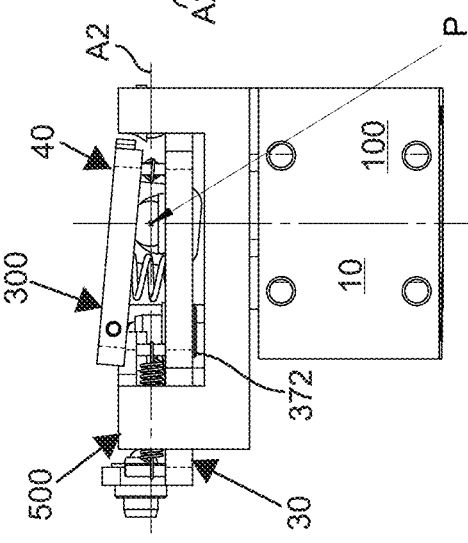

ADJUSTABLE MOUNTING APPARATUS

PRIORITY

This application is a continuation of, and claims the benefit of, International Pat. App. No. PCT/US2022/043867, entitled "Adjustable Mounting Apparatus," filed on Sep. 16, 2022, and published as WO 2023/049047 on Mar. 30, 2023, which itself is an international application of, and claims the benefit of, U.S. provisional patent application 63/249,018, filed Sep. 27, 2021, entitled "Adjustable Mounting Apparatus" the disclosures of each of which are incorporated by reference in their entirety herein.

FIELD

Various aspects of the presently disclosed and claimed technology relate to kinematic mounts, low backlash adjustable mounts, zero backlash adjustable mounts, adjustable slide holders, adjustable sample holders, adjustable kinematic mounts, optical mounts, positioning apparatuses, multiple degree-of-freedom mounts, and the like.

BACKGROUND

Manufacturing tolerances of mounts and housings for optical components are insufficient for achieving the required level of performance for precision optical systems, such as microscopes. Precise lateral and angular alignment of components is typically facilitated by dedicated adjustment stages and mounts.

Commercially available stages and/or mounts offer high levels of precision but suffer from cross-coupling between the various adjustments required. For example, tilt adjustments on an optical instrument made via a pivot that is offset from a center aperture may also result in undesired lateral and/or axial displacements (i.e., displacements perpendicular to and/or co-axial with an axis of the center aperture).

The cross-coupling associated with prior art designs complicates such optical alignment procedures that are sensitive to small axial and/or transverse displacements. For example, a one-degree adjustment for a 1-inch diameter aperture stage may cause an axial shift of about 290 µm. Such prior art designs allow compensation for these undesired displacements, but iteration of multiple adjustment inputs may be required.

Certain gimbal-style mount designs enable angular adjustment about a center of the aperture but are significantly larger for a given capacity, employ pivots that produce unpredictable misalignments, and may have adjustment screws that serve a dual role.

Thus, there is a need for an alignment/positioning mechanism that can make adjustments in 4, 5, and/or 6 degrees-of-freedom without cross-coupling of the adjustment inputs and without backlash. Further, there is a need for such an alignment/positioning mechanism to be compact, economical, and serviceable.

Further limitations and disadvantages of conventional and traditional prior art mount/adjuster/gimbal apparatuses will become apparent to one of skill in the art, through comparison of such mechanisms with certain aspects of the present disclosure, as set forth in the remainder of the present application with reference to the drawings.

BRIEF SUMMARY

The Inventor has recognized the need for a compact 4, 5, and/or 6-axis alignment stage with a virtual center pivot and no or minimal cross-coupling of adjustment inputs. Certain embodiments include three main components: a) a stationary base, b) a first moving member, and c) a second moving member. The first moving member is attached to the stationary base using two spheres each in tangential contact with a pair of cylindrical pins thereby allowing rotary displacement about a first axis defined between the centers of the two spheres and linear displacement along the same first axis. Linear and tilt adjustments of the first moving member with respect to the stationary base are performed by actuating first axis linear and tilt adjustment screws against two preloaded springs. The second moving member is also attached to the first moving member using two spheres each in tangential contact with a pair of cylindrical pins thereby allowing 3) rotary displacement about a second axis defined between the centers of the two spheres and 4) linear displacement along the same second axis. Linear and tilt adjustments of the second moving member with respect to the first moving member are performed by actuating second axis linear and tilt adjustment screws against two preloaded springs. This arrangement may provide zero backlash relative movement about a point at the intersection of the two axes, and the adjustment screws may operate independently of each other without cross-coupling. Additional third-axis linear and/or tilt mechanism(s) may be added.

These and other advantages, aspects, and novel features of the present disclosure, as well as the details of illustrated embodiments thereof, will be more fully understood from the following description and drawings.

BRIEF DESCRIPTION OF THE FIGURES

Embodiments of the present disclosure will now be described, by way of example only, with reference to the attached Figures, wherein:

FIG. 4 is a top plan view of the instrument of FIG. 1;

FIG. 5 is a cross-sectional side elevation view of the instrument of FIG. 1, as called out at FIG. 4;

FIG. 6 is an enlarged portion of FIG. 5, as called out at FIG. 5;

FIG. 7 is a side elevation view of the instrument of FIG. 1;

FIG. 8 is a top plan view of the instrument of FIG. 2;

FIG. 9 is a cross-sectional side elevation view of the instrument of FIG. 2, as called out at FIG. 8;

FIG. 12 is a perspective view of the mounting apparatus of FIG. 1, in accordance with the principles of the present disclosure;

FIG. 13 is a perspective view of a first kinematic mechanism of the mounting apparatus of FIG. 1, in accordance with the principles of the present disclosure;

FIG. 14 is a perspective view of a second kinematic mechanism of the mounting apparatus of FIG. 1, in accordance with the principles of the present disclosure;

FIG. 15 is a perspective view of a first portion of the second kinematic mechanism of FIG. 14, in accordance with the principles of the present disclosure;

FIG. 16 is a perspective view of a second portion of the second kinematic mechanism of FIG. 14, in accordance with the principles of the present disclosure;

FIG. 17 is a perspective view of a third kinematic mechanism of the mounting apparatus of FIG. 1 and illustrates a rotational movement of the third kinematic mechanism relative to that illustrated at FIG. 12, in accordance with the principles of the present disclosure;

FIG. 18 is another perspective view of the second portion of the second kinematic mechanism of FIG. 16;

FIG. 19 is the perspective view of FIG. 18, but exploded;

FIG. 20 is another exploded perspective view of the second portion of the second kinematic mechanism of FIG. 16;

FIG. 21 is yet another exploded perspective view of the second portion of the second kinematic mechanism of FIG. 16;

FIG. 22 is a side view of the second portion of the second kinematic mechanism of FIG. 16;

FIG. 23 is a front view of the second portion of the second kinematic mechanism of FIG. 16;

FIG. 24 is a cross-sectional side view of the second portion of the second kinematic mechanism of FIG. 16, as called out at FIG. 23;

FIG. 27 is a perspective view of the first portion of the second kinematic mechanism of FIG. 15;

FIG. 28 is yet another exploded perspective view of the first portion of the second kinematic mechanism of FIG. 15;

FIG. 29 is a side view of the first portion of the second kinematic mechanism of FIG. 15;

FIG. 30 is a front view of the first portion of the second kinematic mechanism of FIG. 15;

FIG. 31 is a cross-sectional side view of the first portion of the second kinematic mechanism of FIG. 15, as called out at FIG. 30;

FIGS. 35-37 are front views of the first and second kinematic mechanisms of FIGS. 13 and 14 and illustrate linear movements of the first portion of the second kinematic mechanism of FIG. 15, in accordance with the principles of the present disclosure;

FIGS. 38-40 are front views of the first and second kinematic mechanisms of FIGS. 13 and 14 and illustrate linear movements of the second portion of the second kinematic mechanism of FIG. 16, in accordance with the principles of the present disclosure;

FIGS. 41 and 42 are perspective views of the first and second kinematic mechanisms of FIGS. 13 and 14 and illustrate rotational movements of the second portion of the second kinematic mechanism of FIG. 16, in accordance with the principles of the present disclosure;

FIGS. 43-48 are end views of the first and second kinematic mechanisms of FIGS. 13 and 14 and illustrate rotational movements of the second portion of the second kinematic mechanism of FIG. 16, in accordance with the principles of the present disclosure;

DETAILED DESCRIPTION

Figure 1:
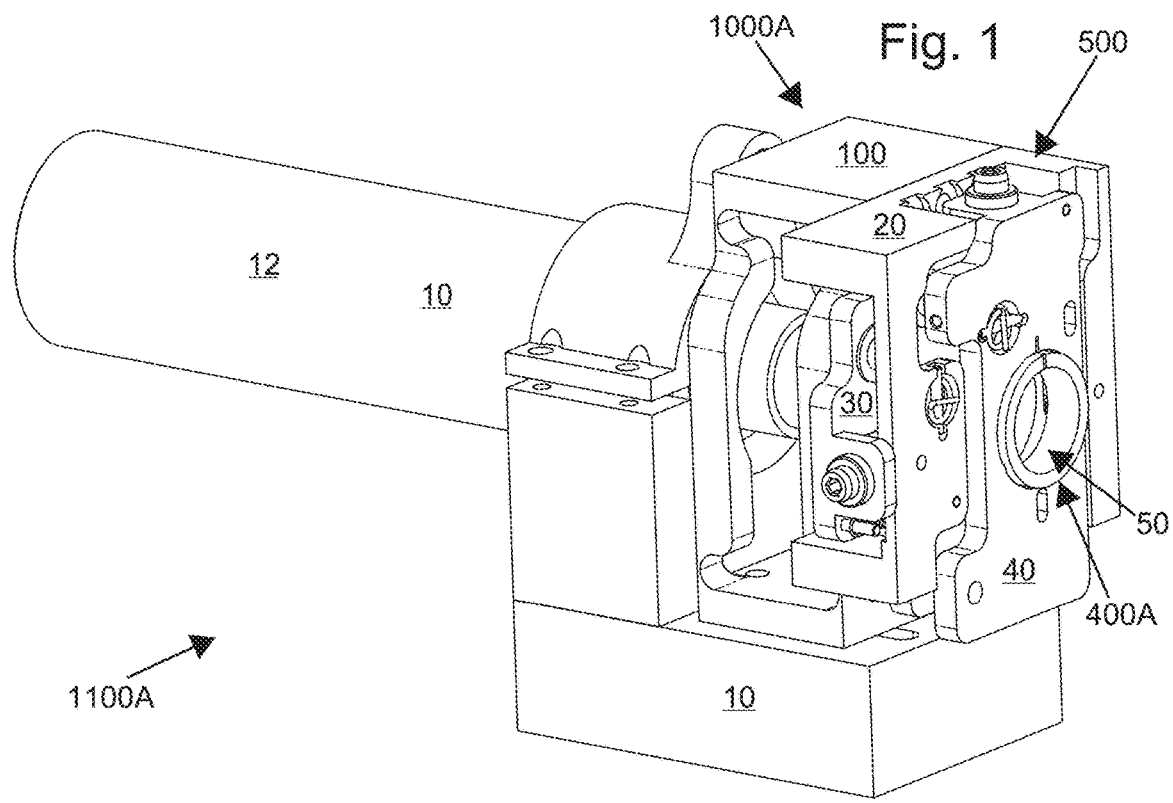
FIG. 1 is a perspective view of a first embodiment of an instrument with a mounting apparatus, in accordance with the principles of the present disclosure.

Various embodiments will be described in detail with reference to the drawings, wherein like reference numerals represent like parts and assemblies throughout the several views. It is to be understood that this disclosure is not limited to the particular methodology and examples described herein and as such may vary. It is also to be understood that the terminology used herein is for the purpose of describing particular embodiments only and is not intended to limit the scope of the present disclosure or the appended claims.

As used herein and in the appended claims, the singular forms "a", "an", and "the" include plural reference unless the context clearly indicates otherwise.

Unless defined otherwise, all technical and scientific terms used herein have the same meaning as commonly understood to one of ordinary skill in the art to which this disclosure belongs.

According to the principles of the present disclosure, an adjustable apparatus may be used to position a first object 12 with respect to a second object 42, 42H, 42U, 52. In the example depicted embodiments, the first object 12 is a microscope, and the second object 42, 42H, 42U, 52 is a flow cell 42H, 42U in one embodiment (see items 42, 42H, 42U, at FIGS. 2 and 8-11) and a slide in another embodiment (see item 52 at FIG. 6 and at parent FIG. 5). In still other embodiments, the first object 12 may be a device, tool, sample, workpiece, holder, slide, slide holder, laser, flow cell, wafer, camera, probe, mask, electron emitter, lithographic head, etc., and/or the second object 42, 52 may be a device, tool, sample, workpiece, holder, slide holder, microscope, laser, wafer, camera, probe, mask, electron emitter, lithographic head, etc.

In the example embodiments illustrated at the figures, the first object 12 is an analysis device (e.g., the microscope, a probe, a camera, etc.) and the second object 42, 42H, 42U, 52 is being analyzed, studied, measured, observed, tracked, etc. by the analysis device. In other embodiments, the first object 12 is a tool (e.g., a device, a holder, a laser, a laser welder, a probe, an electron emitter, a machine tool, a lithographic head, etc.), and the second object 42, 52 is a workpiece (e.g., an object, a device, a sample, a slide, a wafer, a mask, etc. being worked by the tool). In still other embodiments, the first object 12 is a first article, and the second object 42, 52 is a second article. In yet other embodiments, the first object 12 is a first portion of an item, and the second object 42, 52 is a second portion of the same item, and the item may be flexible, deformable, etc., and an adjustable apparatus may be used to move the first and second portions relative to each other and thereby deform, flex, etc. the item.

According to the principles of the present disclosure, the example flow cell 42U may be a flow cell used in a urinalysis instrument (e.g., a urinalysis analyzer), and/or the example flow cell 42H may be a flow cell used in a hematology instrument (e.g., a hematology analyzer). According to the principles of the present disclosure, an adjustable apparatus may be incorporated into an analysis instrument (e.g., a urinalysis instrument, a urinalysis analyzer, a hematology instrument, a hematology analyzer, a microscope instrument, etc.), may be incorporated into a tool arrangement (e.g., a welder arrangement, a machine tool arrangement, a lithographic arrangement, etc.), and/or may be used in a variety of imaging instrumentation such as urine analysis systems, hematology/blood analysis systems, and/or other diagnostic imaging platforms.

In certain embodiments, an adjustable apparatus, according to the principles of the present disclosure, may be incorporated into an arrangement that is both an analysis instrument and a tool arrangement (e.g., a welder that also inspect welds that it has made).

Turning now to FIGS. 1 and 3-7, an instrument 1100A is illustrated according to the principles of the present disclosure. In the example shown, the instrument 1100A includes an adjustable apparatus 1000A (e.g., a moveable apparatus, a kinematic mechanism, a combined kinematic mechanism, etc.) configured to position a microscope 12 with respect to a slide 52 (see FIGS. 5 and 6) and thereby position, align, orient, etc. a focal location 14 of the microscope 12 with a target location 54 of the slide 52. In particular, the focal location 14 may be determined by a first lens 12A and a second lens 12B of the microscope 12 and, if so equipped, a position of a sensor image plane 18 of a sensor 16 of the microscope 12. (FIG. 5 illustrates the lenses 12A, 12B, the image plane 18, and the focal location 14 with a first ray R1, a second ray R2, a third ray R3, and a fourth ray R4 in an illustration manner known in the art of optical devices.) The adjustable apparatus 1000A is further illustrated, according to the principles of the present disclosure, at FIGS. 11 and 12.

Figure 2:
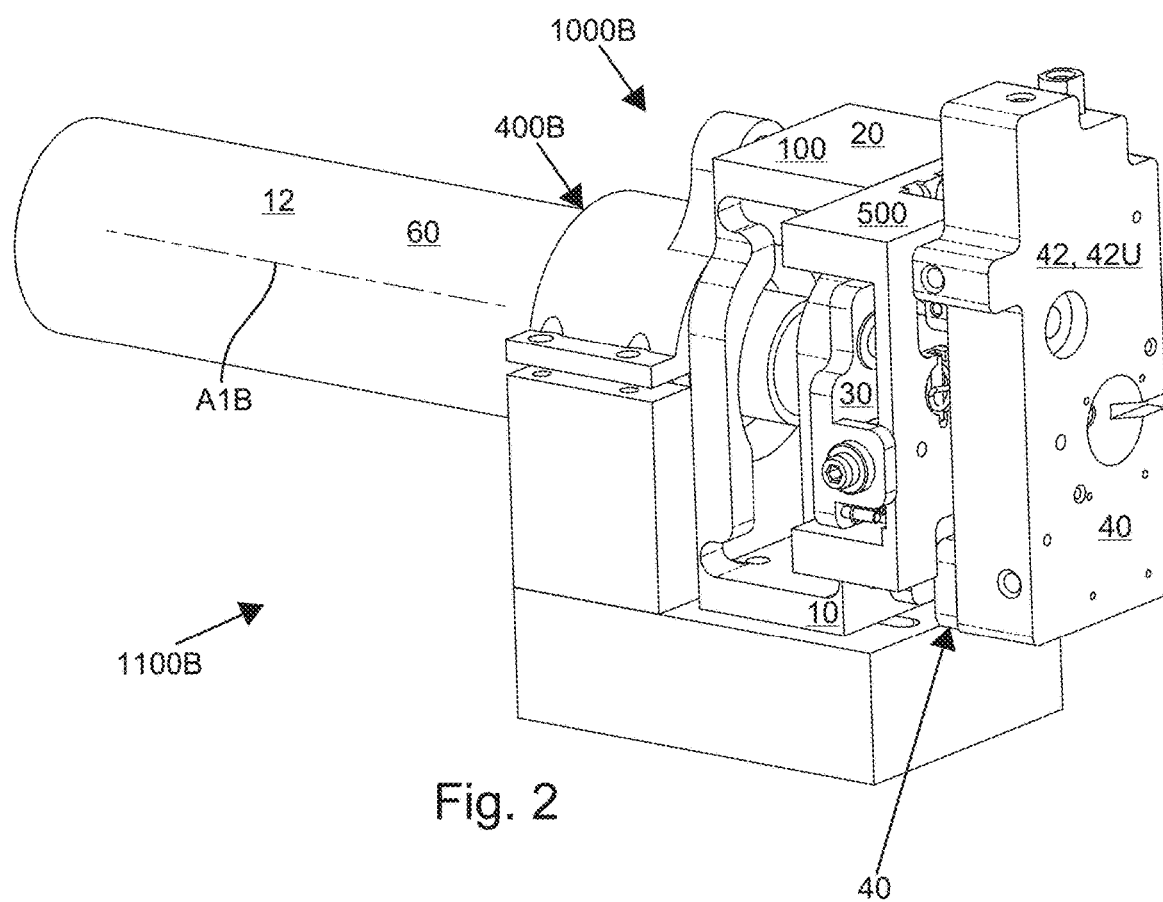
FIG. 2 is a perspective view of a second embodiment of an instrument with a flow cell mounted on a mounting apparatus, in accordance with the principles of the present disclosure.
Figure 3:
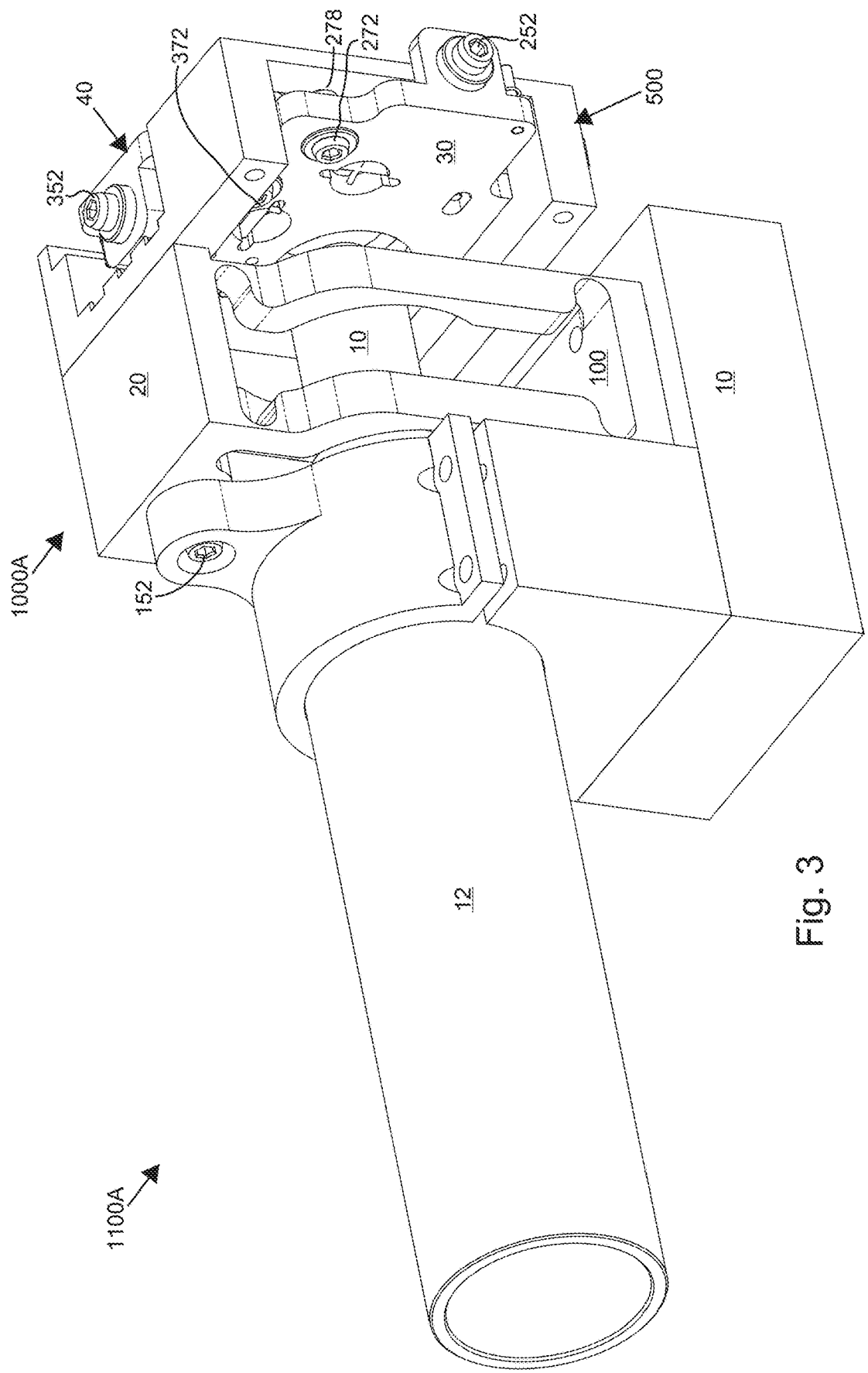
FIG. 3 is another perspective view of the instrument of FIG. 1.

Turning now to FIGS. 2, 8, and 9, an instrument 1100B is illustrated according to the principles of the present disclosure. In the example shown, the instrument 1100B includes an adjustable apparatus 1000B (e.g., a moveable apparatus, a kinematic mechanism, a combined kinematic mechanism, etc.) configured to position a microscope 12 with respect to a flow cell 42U, 42H (see also FIGS. 10 and 11) and thereby position, align, orient, etc. a focal location 14 of the microscope 12 (see FIG. 5) with a target location 44 of the flow cell 42U, 42H (see FIGS. 9-11). As described above, the focal location 14 may be determined by lenses 12A and 12B and, if so equipped, a position of the sensor image plane 18.

According to the principles of the present disclosure and as will be explained in detail hereinafter, the adjustable apparatus 1000A, 1000B may position, orient, align, etc. the focal location 14 of the microscope 12 with respect to the target location 54 of the slide 52 (1000A) and/or with respect to the target location 44 of the flow cell 42U, 42H (1000B) in six degrees-of-freedom (d-o-f) including translation along and rotation about an axis A1A (see FIGS. 4, 12, and 17 for 1000A) and/or an axis A1B (see FIGS. 2, 8, and 9 for 1000B), translation along and rotation about an axis A2 (see FIG. 12 for 1000A and FIGS. 25, 27, 28, 30, and 31 for 1000A, 1000B), and translation along and rotation about an axis A3 (see FIG. 12 for 1000A and FIGS. 18-21, 23, and 24 for 1000A, 1000B). Axis A1 may refer generically to the axes A1A and A1B. In the depicted embodiments, the axes A1, A2, and A3 are mutually orthogonal to each other, at least in a neutral configuration (see FIG. 12). In the depicted embodiments, the axes A1, A2, and A3 intersect with each other at a point P, at least in the neutral configuration (see FIGS. 5, 6, 9, 12, 35, 38, 41, 42, 44, 46, 48-50, 52, 54, and 56). In certain embodiments, the axes A1, A2, and A3 continuously intersect with each other at the point P.

In certain embodiments and according to the principles of the present disclosure, the adjustable apparatus 1000A, 1000B may be replaced by (i.e., used in place of) an adjustable apparatus 500. In the illustrated embodiments, the adjustable apparatus 500 is a subset of the adjustable apparatus 1000A, 1000B and is illustrated at FIGS. 1-5, 7-9, 11, 12, 14, 32, and 35-58. The adjustable apparatus 500 may position, orient, align, etc. the focal location 14 of the microscope 12 with respect to the target location 54 of the slide 52 and/or with respect to the target location 44 of the flow cell 42U, 42H in four d-o-f including translation along and rotation about the axis A2 (see FIGS. 12, 25, 27, 28, 30, and 31) and translation along and rotation about the axis A3 (see FIGS. 12, 18-21, 23, and 24). The adjustable apparatus 500 may further position, orient, align, etc. the first object 12 with respect to the second object 42, 42H, 42U, 52 in four d-o-f, as generally described above. Thus, as illustrated at the figures, the adjustable apparatus 500 does not provide translation along nor rotation about the axes A1, A1A, A1B.

However, in certain embodiments and according to the principles of the present disclosure, an adjustable apparatus 400A may be combined with the adjustable apparatus 500 and thereby add a single degree-of-freedom (d-o-f) of rotation about the axis A1A (see FIGS. 4, 12, and 17) to provide five d-o-f for manipulation of a first object 12 with respect to a second object 52, as generally described above. In the illustrated embodiments, the adjustable apparatus 400A is a subset of the adjustable apparatus 1000A. Similarly, in certain embodiments and according to the principles of the present disclosure, an adjustable apparatus 400B may be combined with the adjustable apparatus 500 and thereby add a single d-o-f of rotation about the axis A1B (see FIGS. 2, 8, and 9) to provide five d-o-f for manipulation of a first object 12 with respect to a second object 42, 42H, 42U, as generally described above. In the illustrated embodiments, the adjustable apparatus 400B is a subset of the adjustable apparatus 1000B.

Similarly, in certain embodiments and according to the principles of the present disclosure, an adjustable apparatus 400C may be combined with the adjustable apparatus 500 and thereby add two d-o-f of translation along and rotation about the axis A1A (see FIGS. 4, 12, and 17) to provide six d-o-f for manipulation of a first object 12 with respect to a second object 52, as generally described above. Similarly, in certain embodiments and according to the principles of the present disclosure, an adjustable apparatus 400D may be combined with the adjustable apparatus 500 and thereby add two d-o-f of translation along and rotation about the axis A1B (see FIGS. 2, 8, and 9) to provide six d-o-f for manipulation of a first object 12 with respect to a second object 42, 42H, 42U, as generally described above.

In certain embodiments and according to the principles of the present disclosure, an adjustable apparatus 100 may be combined with the adjustable apparatus 500 and thereby add a single d-o-f of translation along the axis A1 (see FIGS. 13, 57, and 58) to provide five d-o-f for manipulation of a first object 12 with respect to a second object 42, 42H, 42U, 52, as generally described above. In the illustrated embodiments, the adjustable apparatus 100 is a subset of the adjustable apparatus 1000A, 1000B.

In certain embodiments and according to the principles of the present disclosure, the adjustable apparatus 500 (see FIGS. 14 and 32) may include an adjustable apparatus 200 (see FIGS. 15, 25-31, 34-37, and 49-56) and an adjustable apparatus 300 (see FIGS. 16, 18-24, 33, and 38-48). In the illustrated embodiments, the adjustable apparatuses 200 and 300 are subsets of the adjustable apparatus 500. The adjustable apparatuses 200 and 300 may serve within the adjustable apparatus 500 to position, orient, align, etc. the first object 12 with respect to the second object 42, 42H, 42U, 52, as generally described above. In particular, the adjustable apparatus 200 may provide two d-o-f including translation along and rotation about the axis A2, and the adjustable apparatus 300 may provide two d-o-f including translation along and rotation about the axis A3. As mentioned above, in the depicted embodiment, the axes A2 and A3 are mutually orthogonal to each other, at least in the neutral configuration (see FIG. 12).

Figure 57:
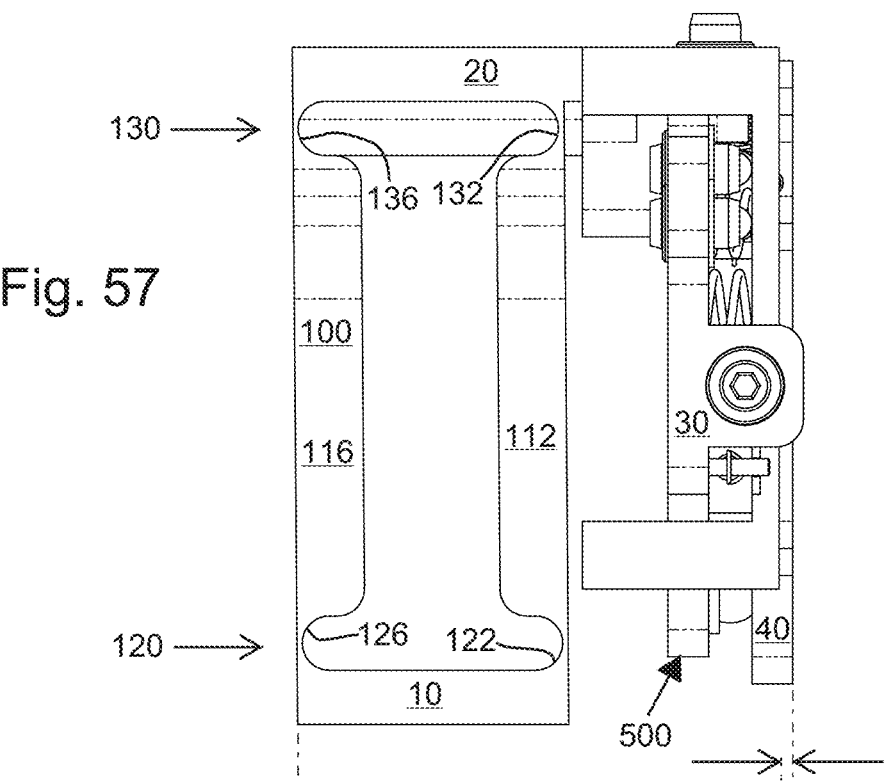
FIGS. 57 and 58 are side views of the first and second kinematic mechanisms of FIGS. 13 and 14 and illustrate linear movement of the first kinematic mechanism of FIG. 13, in accordance with the principles of the present disclosure.
Figure 58:
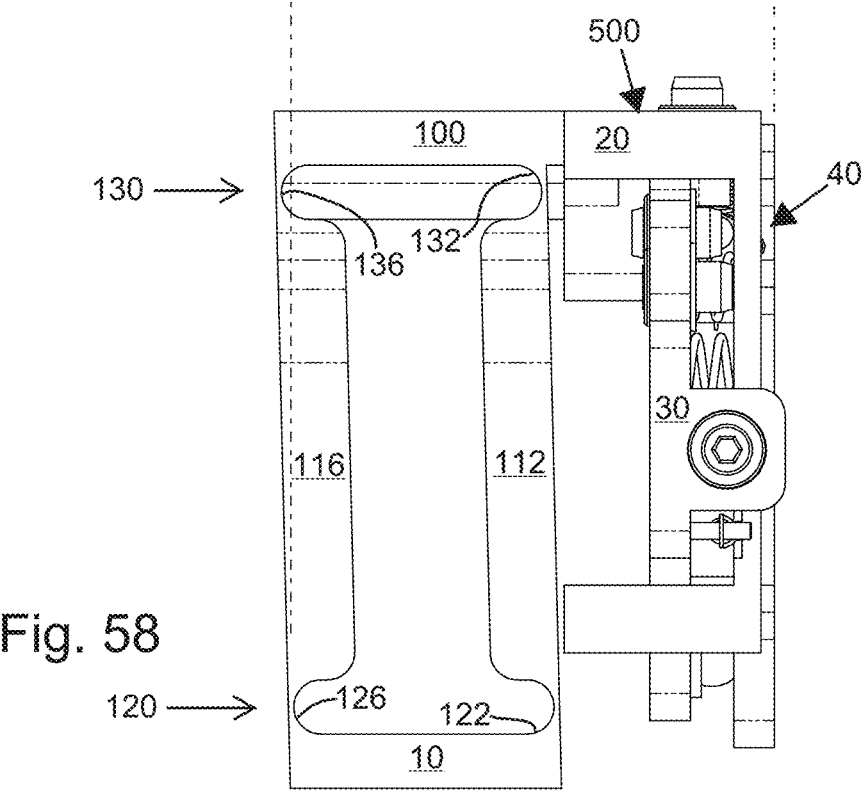

Turning now to FIGS. 13, 57, and 58, movement (i.e., kinematic movement) of the adjustable apparatus 100 is illustrated according to the principles of the present disclosure. The adjustable apparatus 100 includes a joint 110 (i.e. a flexure joint, a prismatic joint, etc.) between a first end 102 and a second end 104 of the adjustable apparatus 100. In the depicted embodiment, the first end 102 is adjacent a first flexure set 120, and the second end 104 is adjacent a second flexure set 130. In other embodiments, a flexure set could extend between the opposite ends 102, 104. As depicted, the first flexure set 120 includes four flexures 122, 124, 126, and 128, and the second flexure set 130 includes four flexures 132, 134, 136, and 138. Four beams 112, 114, 116, and 118 extend between the corresponding flexures 122, 124, 126, 128, 132, 134, 136, and 138. As depicted, the joint 110 is a one-piece flexure joint and therefore is a zero backlash joint. The joint 110 thereby provides the adjustable apparatus 100 with the single d-o-f of linear movement along the axis A1 (i.e., $\Delta Z$ as illustrated at FIGS. 57 and 58). Linear adjustment 150 of the joint 110 and thereby adjustment of the single d-o-f of linear movement along the axis A1 may be accomplished by turning an adjuster 152 (i.e., an actuator) within its mount 154 and thereby causing a tip 156 of the adjuster 152 to press against a push pad 158. The flexure joint 110 may be spring loaded and thereby retain itself. Thus, the flexures 122, 124, 126, 128, 132, 134, 136, 138 and the beams 112, 114, 116, 118 may serve as springs 162, and the ends 102, 104 may respectively serve as spring mounts 164, 166 and thereby together function as a linear retention set 160. As depicted at FIGS. 5, 6, and 9, the joint 110 may be used to focus the microscope 12 on the target location 44, 54. As is known in the art of flexure joints, movement perpendicular to the linear movement along the axis A1 (i.e., $\Delta Z$) may be made to be negligibly small via appropriate design selection.

Turning now to FIGS. 15, 25-31, 34-37, and 49-56, movement (i.e., kinematic movement) of the adjustable apparatus 200 is illustrated according to the principles of the present disclosure. The adjustable apparatus 200 includes a joint 210 (see FIG. 27) between a first end 202 and a second end 204 of the adjustable apparatus 200. In the depicted embodiment, the first end 202 includes a first element set 220, and the second end 204 includes a second element set 240. In other embodiments, the element sets 220, 240 could be swapped to the opposite ends 204, 202. The first and second element sets 220 and 240 may interface with each other to form the joint 210.

As depicted, the first element set 220 includes a first spherical surface 222 (e.g., a bearing ball) and a second spherical surface 224 (e.g., a bearing ball). As depicted, the second element set 240 includes a first cylinder 242 (e.g., a dowel pin), a second cylinder 244 (e.g., a dowel pin), a third cylinder 246 (e.g., a dowel pin), and a fourth cylinder 248 (e.g., a dowel pin). In the depicted embodiment, the first spherical surface 222 is cradled between the first and second cylinders 242, 244, and the second spherical surface 224 is cradled between the third and fourth cylinders 246, 248. As depicted, the cylinders 242, 244, 246, 248 are parallel to each other and to the axis A2. The spherical surfaces 222, 224 may thereby slide along the respective cylinders 242, 244, 246, 248 and thereby along the axis A2. The spherical surfaces 222, 224 may thereby rotate about the axis A2 which is defined by centers of the spherical surfaces 222, 224.

The first element set 220 may be spring-loaded against the second element set 240 by a spring 282 operating in tension within a compression triangle 230, and the joint 210 may thereby be a zero backlash joint and further be kept from coming apart even if loads are applied to the joint 210 that would otherwise separate the joint 210. The spring 282 may thereby further serve as a component of a rotational retention set 280 and be connected to a first mount 284 on the first end 202 and a second mount 286 on the second end 204.

A rotational adjustment set 270 may facilitate rotational adjustment of the joint 210 and thereby control rotational movement about the axis A2. In the depicted embodiment, turning an adjuster 272 (i.e., an actuator) within its mount 274 thereby causes a tip 276 of the adjuster 272 to press against a push pad 278 and thereby control rotational movement about the axis A2. A linear adjustment set 250 may facilitate linear adjustment of the joint 210 and thereby control linear movement along the axis A2. In the depicted embodiment, turning an adjuster 252 (i.e., an actuator) within its mount 254 thereby causes a tip 256 of the adjuster 252 to press against a push pad 258 and thereby control linear movement along the axis A2.

A linear retention set 260 may include a spring 262 in tension that causes preloading of the adjuster 252. The spring 262 may be mounted by a first spring mount 264 on the first end 202 and a second spring mount 266 on the second end 204. The joint 210 may further include an over-travel constraint 264, 268.

The joint 210 thereby provides the adjustable apparatus 200 with the two d-o-f of linear movement along and/or rotation about the axis A2.

Turning now to FIGS. 16, 18-24, 33, and 38-48, movement (i.e., kinematic movement) of the adjustable apparatus 300 is illustrated according to the principles of the present disclosure. The adjustable apparatus 300 includes a joint 310 (see FIG. 18) between a first end 302 and a second end 304 of the adjustable apparatus 300. In the depicted embodiment, the first end 302 includes a first element set 320, and the second end 304 includes a second element set 340. In other embodiments, the element sets 320, 340 could be swapped to the opposite ends 304, 302. The first and second element sets 320 and 340 may interface with each other to form the joint 310.

As depicted, the first element set 320 includes a first spherical surface 322 (e.g., a bearing ball) and a second spherical surface 324 (e.g., a bearing ball). As depicted, the second element set 340 includes a first cylinder 342 (e.g., a dowel pin), a second cylinder 344 (e.g., a dowel pin), a third cylinder 346 (e.g., a dowel pin), and a fourth cylinder 348 (e.g., a dowel pin). In the depicted embodiment, the first spherical surface 322 is cradled between the first and second cylinders 342, 344, and the second spherical surface 324 is cradled between the third and fourth cylinders 346, 348. As depicted, the cylinders 342, 344, 346, 348 are parallel to each other and to the axis A3. The spherical surfaces 322, 324 may thereby slide along the respective cylinders 342, 344, 346, 348 and thereby along the axis A3. The spherical surfaces 322, 324 may thereby rotate about the axis A3 which is defined by centers of the spherical surfaces 322, 324.

The first element set 320 may be spring-loaded against the second element set 340 by a spring 382 operating in tension within a compression triangle 330, and the joint 310 may thereby be a zero backlash joint and further be kept from coming apart even if loads are applied to the joint 310 that would otherwise separate the joint 310. The spring 382 may thereby further serve as a component of a rotational retention set 380 and be connected to a first mount 384 on the first end 302 and a second mount 386 on the second end 304.

A rotational adjustment set 370 may facilitate rotational adjustment of the joint 310 and thereby control rotational movement about the axis A3. In the depicted embodiment, turning an adjuster 372 (i.e., an actuator) within its mount 374 thereby causes a tip 376 of the adjuster 372 to press against a push pad 378 and thereby control rotational movement about the axis A3. A linear adjustment set 350 may facilitate linear adjustment of the joint 310 and thereby control linear movement along the axis A3. In the depicted embodiment, turning an adjuster 352 (i.e., an actuator) within its mount 354 thereby causes a tip 356 of the adjuster 352 to press against a push pad 358 and thereby control linear movement along the axis A3.

A linear retention set 360 may include a spring 362 in tension that causes preloading of the adjuster 352. The spring 362 may be mounted by a first spring mount 364 on the first end 302 and a second spring mount 366 on the second end 304. The joint 310 may further include an over-travel constraint 334, 364, 368.

The joint 310 thereby provides the adjustable apparatus 300 with the two d-o-f of linear movement along and/or rotation about the axis A3.

Figure 25:
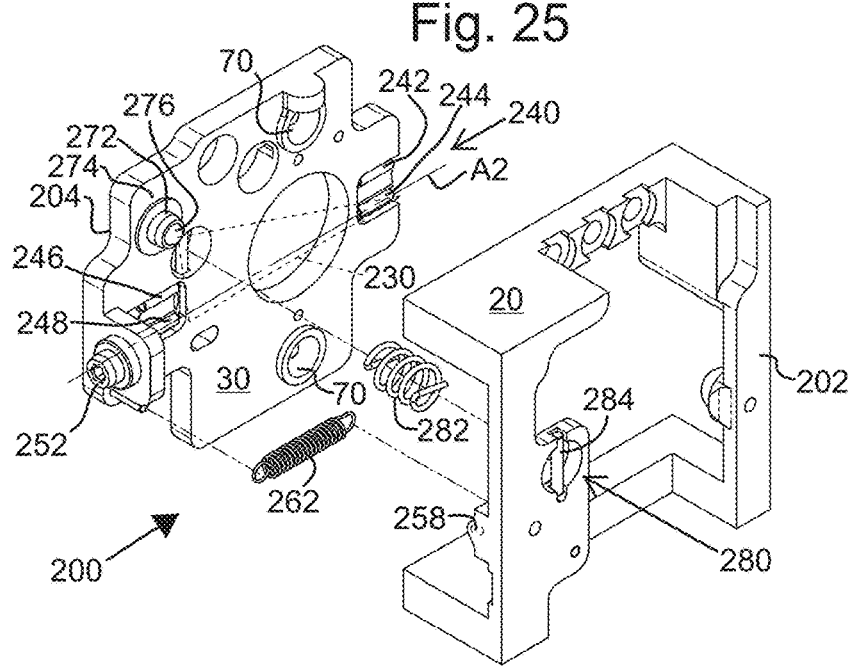
FIG. 25 is an exploded perspective view of the first portion of the second kinematic mechanism of FIG. 15.
Figure 26:
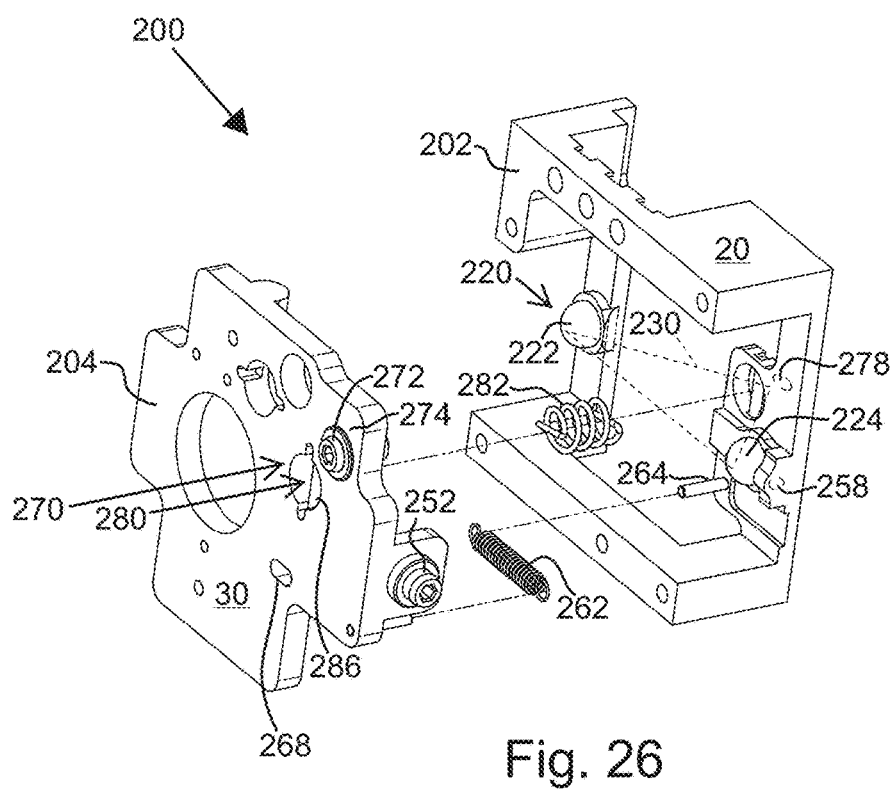
FIG. 26 is another exploded perspective view of the first portion of the second kinematic mechanism of FIG. 15.
Figure 32:
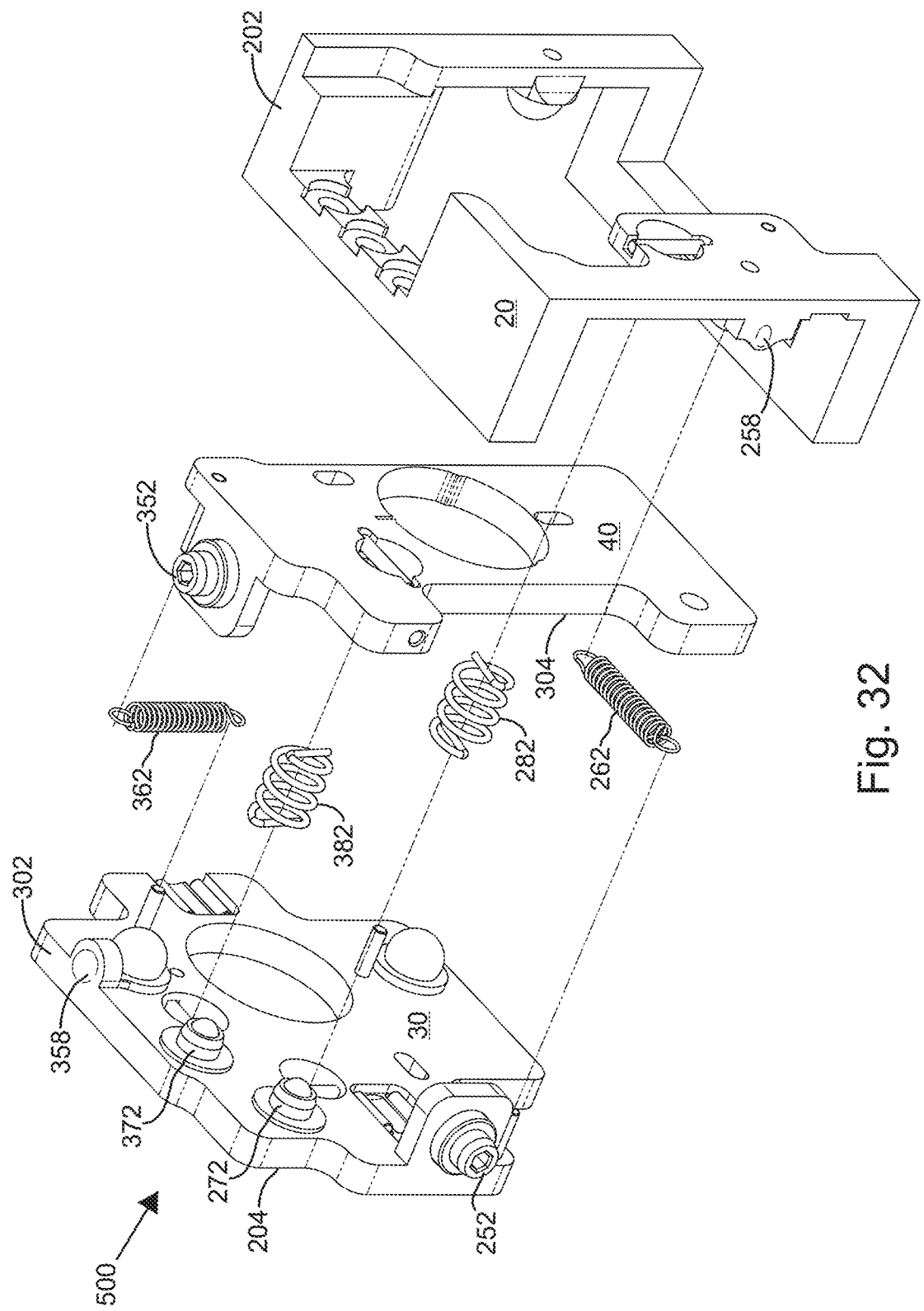
FIG. 32 is an exploded perspective view of the second kinematic mechanism of FIG. 14.
Figure 33:
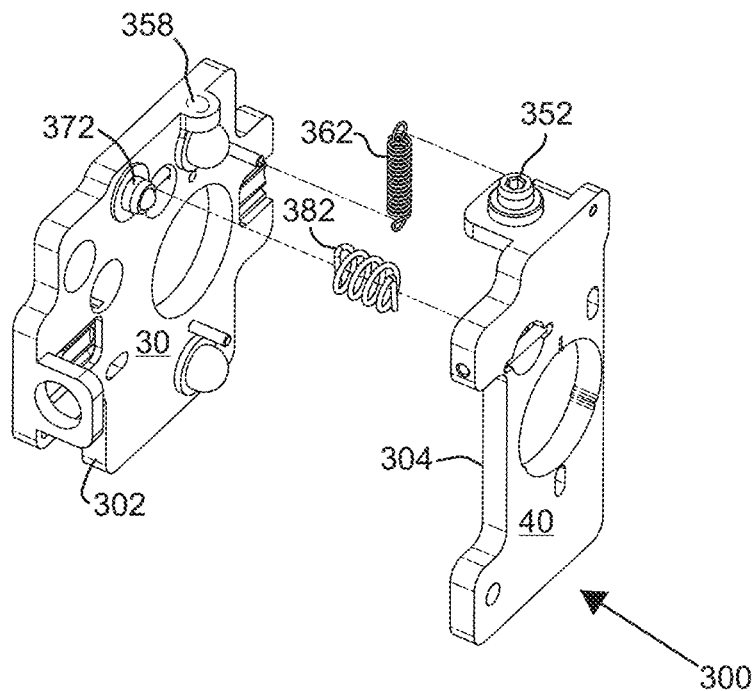
FIG. 33 is the exploded perspective view of FIG. 32, but showing only the second portion of the second kinematic mechanism of FIG. 16.
Figure 34:
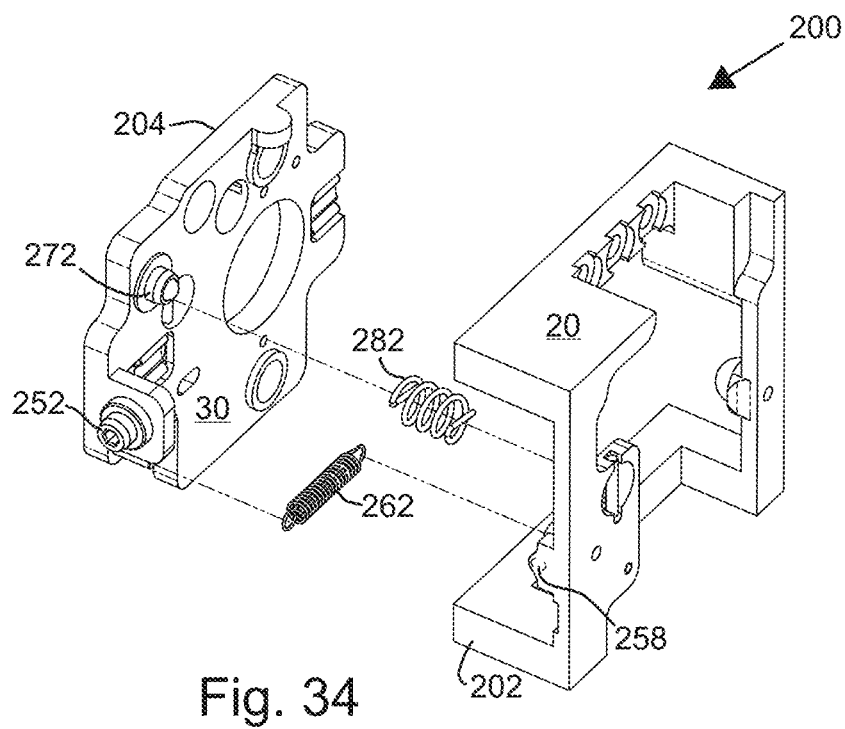
FIG. 34 is the exploded perspective view of FIG. 32, but showing only the first portion of the second kinematic mechanism of FIG. 15.
Figure 49:
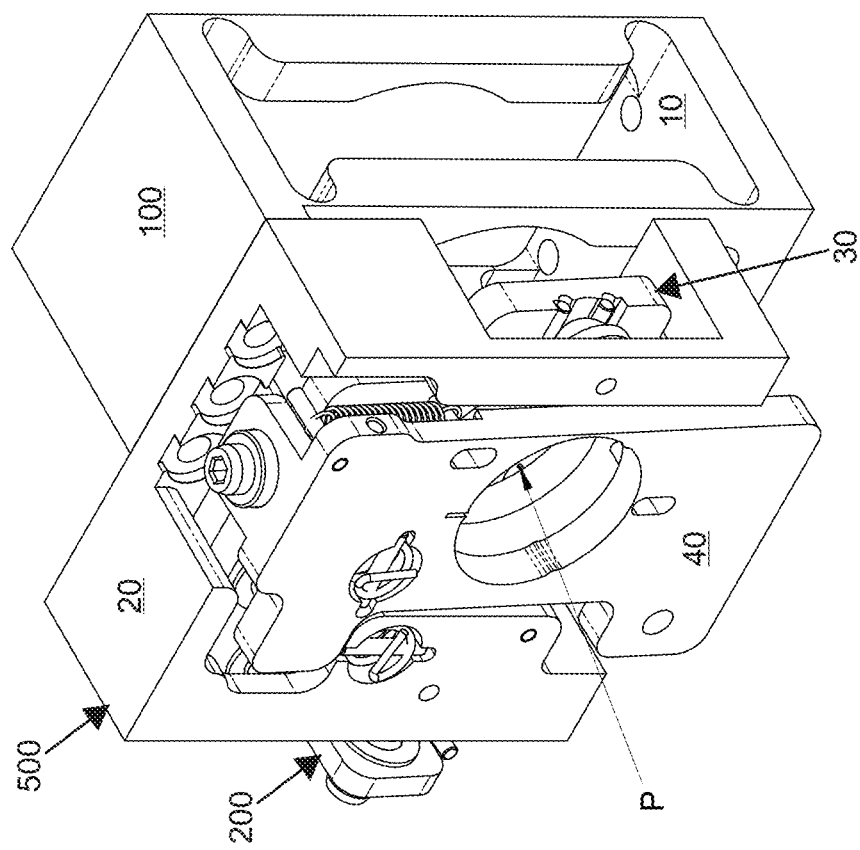
FIGS. 49 and 50 are perspective views of the first and second kinematic mechanisms of FIGS. 13 and 14 and illustrate rotational movements of the first portion of the second kinematic mechanism of FIG. 15, in accordance with the principles of the present disclosure.
Figure 50:
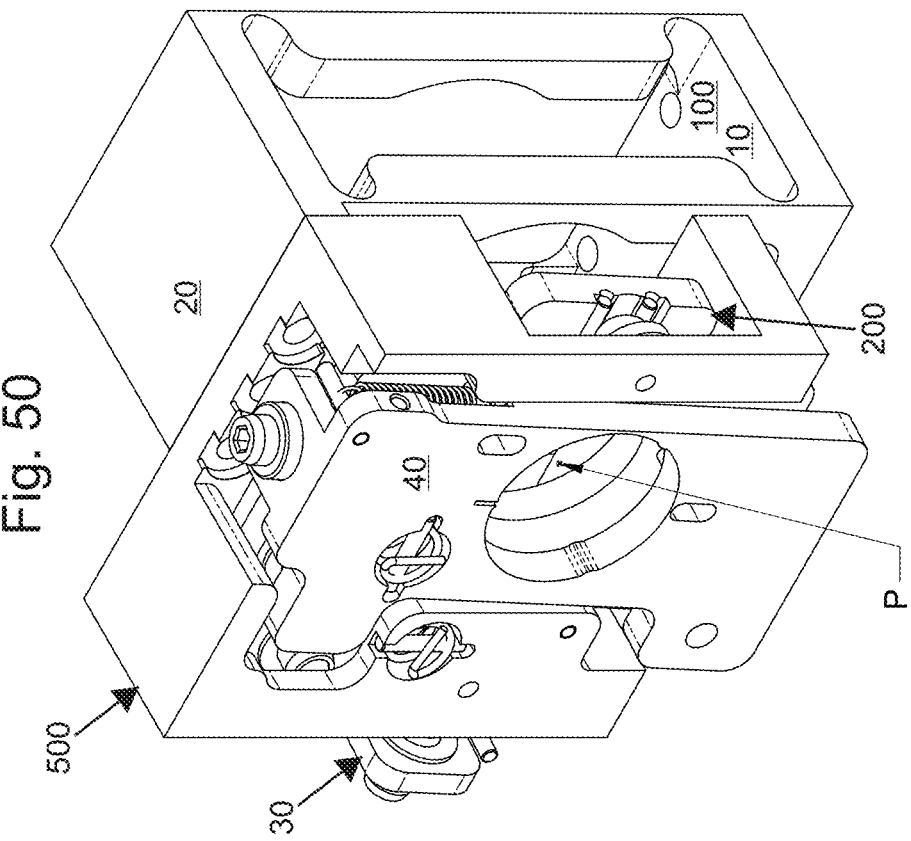
Figure 53:
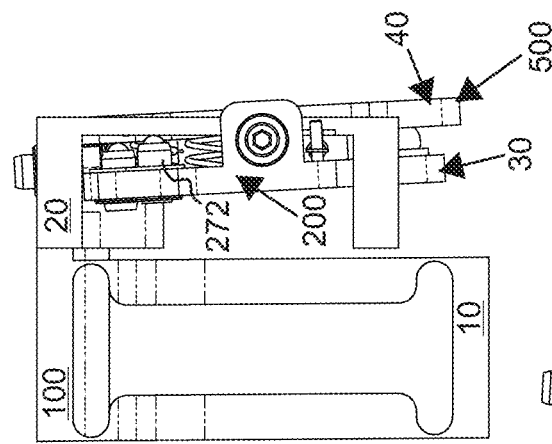
FIGS. 51-56 are side views of the first and second kinematic mechanisms of FIGS. 13 and 14 and illustrate rotational movements of the first portion of the second kinematic mechanism of FIG. 15, in accordance with the principles of the present disclosure.
Figure 51:
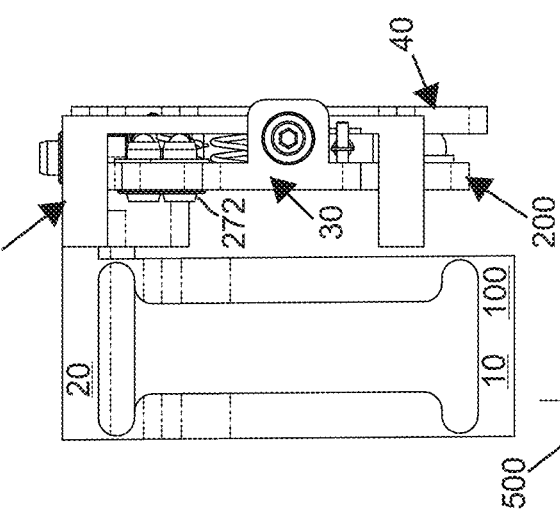
Figure 55:
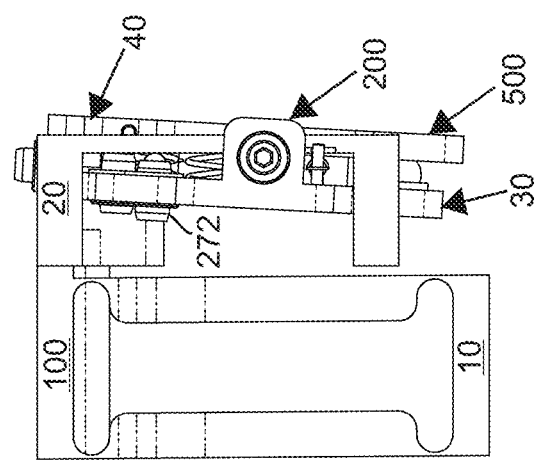
Figure 54:
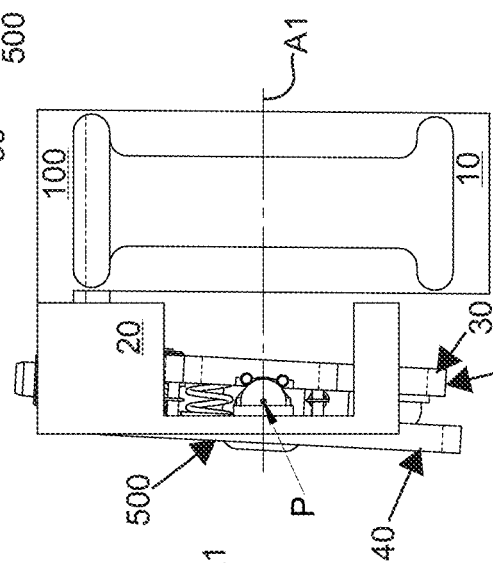
Figure 52:
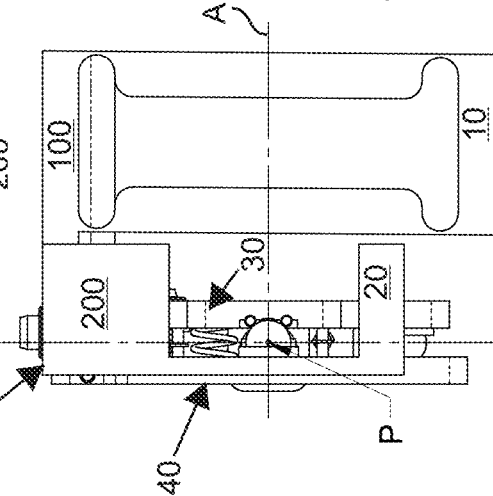
Figure 56:
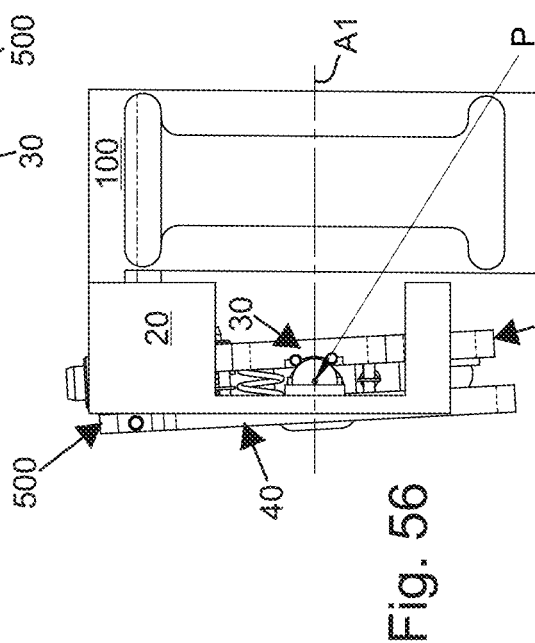

The spherical surfaces 222, 224, 322, 324 may be mounted in mounts 70, as illustrated at FIGS. 25 and 31 in such a way that no slop is present in their mounting. The cylinders 242, 244, 246, 248, 342, 344, 346, 348 may be mounted in mounts 72, as illustrated at FIGS. 20 and 23 in such a way that no slop is present in their mounting.

As depicted at FIG. 4, offsets 390 may exist between the actuator 252, 352 and the corresponding spring 262, 362. Such offsets 390 may be beneficial in packaging the components of the adjustable apparatus 200, 300, 500. The spring 282, 382 may be sized to be strong enough that the adjustable apparatus 200, 300, 500 can accommodate such offsets 390. As depicted, offset 390Z separates centers of the actuator 352 and the spring 362 along the axis A1, and offset 390X separates the centers of the actuator 352 and the spring 362 along axis A2.

Turning now to FIGS. 12 and 17, movement (i.e., kinematic movement) of the adjustable apparatus 400A is illustrated according to the principles of the present disclosure. The adjustable apparatus 400A includes a joint 410 between a first end 402 and a second end 404 of the adjustable apparatus 400A. In the depicted embodiment, the first end 402 includes a first element set 420, and the second end 404 includes a second element set 440. In other embodiments, the element sets 420, 440 could be swapped to the opposite ends 404, 402. The first and second element sets 420 and 440 may interface with each other to form the joint 410. As depicted, the first element set 420 includes a bore 422, a first raised contact 424, a second raised contact 426, and a third raised contact 428. Adjacent the bore 422, an index mark 430 is positioned on the first end 402 radially extending outwardly from the bore 422. As depicted, the second element set 440 includes a cylinder 442 (i.e., a journal) and an index mark 450 positioned on the second end 404 radially extending inwardly from the cylinder 442. An axial retainer 444 is depicted at the second end 404 (see FIG. 5). In other embodiments, an axial retainer may be at the first and/or second ends 402, 404. The cylinder 442 may have an interference fit with the three raised contacts 422, 424, 426, and the joint 410 may thereby be a zero backlash joint. The joint 410 thereby provides the adjustable apparatus 400A with the single d-o-f of rotation about the axis A1A. Adjustment of the joint 410 and thereby adjustment of the single d-o-f of rotation about the axis A1A may be accomplished by turning a protruding portion 446 (i.e., actuating an actuator) of the cylinder 442. As depicted at FIG. 6, the second object 52 may be mounted to the second end 404 of the joint 410.

In certain embodiments, the joint 410 may be configured as a two d-o-f joint with translation along and rotation about the axis A1A (see FIGS. 4, 12, and 17) and thereby configure the joint 410 for the adjustable apparatus 400C, including the joint 410 modified as a joint 410C between the first end 402 and the second end 404 of the adjustable apparatus 400C. For example, the axial retainer 444 of the preceding paragraph may be removed and thereby allow the cylinder 442 and the bore 422 (with or without the three raised contacts 422, 424, 426) to operate as the 2 d-o-f cylindrical joint 410C. Adjustment of the joint 410C and thereby adjustment of the two d-o-f of translation along and/or rotation about the axis A1A may be accomplished by pushing or pulling and/or turning the protruding portion 446 (i.e., actuating actuators) of the cylinder 442.

Turning now to FIGS. 2, 8, and 9, movement (i.e., kinematic movement) of the adjustable apparatus 400B is illustrated according to the principles of the present disclosure. The adjustable apparatus 400B includes a joint 460 between a first end 406 and a second end 408 of the adjustable apparatus 400B. In the depicted embodiment, the first end 406 includes a first element set 470, and the second end 408 includes a second element set 480. In other embodiments, the element sets 470, 480 could be swapped to the opposite ends 406, 408. The first and second element sets 470 and 480 may interface with each other to form the joint 460. As depicted, the first element set 470 includes a clampable bore 472 and a clamp 474. As depicted, the second element set 480 includes a cylinder 482 (i.e., a journal). An axial retainer 484 is depicted at the first end 406 (see FIG. 9). In other embodiments, an axial retainer may be at the first and/or second ends 406, 408. The cylinder 482 may be clamped within the clampable bore 472 by the clamp 474 and thereby fix the joint 460. When unclamped, the cylinder 482 may be rotated within the clampable bore 472, and the joint 460 may thereby provide the adjustable apparatus 400B with the single d-o-f of rotation about the axis A1B. Adjustment of the joint 460 and thereby adjustment of the single d-o-f of rotation about the axis A1B may be accomplished by turning a protruding portion (i.e., actuating an actuator) of the cylinder 482.

In certain embodiments, the joint 460 may be configured as a two d-o-f joint with translation along and rotation about the axis A1B and thereby configure the joint 460 for the adjustable apparatus 400D, including the joint 460 modified as a joint 460D between the first end 406 and the second end 408 of the adjustable apparatus 400D. For example, the axial retainer 484 of the preceding paragraph may be removed and thereby allow the cylinder 482 and the bore 472 to operate as the 2 d-o-f cylindrical joint 460D. Adjustment of the joint 460D and thereby adjustment of the two d-o-f of translation along and/or rotation about the axis A1D may be accomplished by unclamping the clamp 474 and pushing or pulling and/or turning the protruding portion (i.e., actuating actuators) of the cylinder 482 and then reclamping the clamp 474.

The mechanisms 500, 1000A, 1000B may have particular utility in imaging systems utilizing a high degree of precision, including imaging systems used to image particularly small objects (e.g., urine analysis systems, or hematology systems used to image blood cells). In such systems, the optical systems need to be carefully calibrated given the precision required to image such small target objects.

According to the principles of the present disclosure, a kinematic mechanism 500 may be used to adjust the instruments 1100A, 1100B and thereby align various components within the instruments 1100A, 1100B. As illustrated in the example embodiments of the present disclosure, the kinematic mechanism 500 includes two translational d-o-f and two rotational d-o-f. In certain embodiments, a kinematic mechanism 100 may further be used to adjust the instruments 1100A, 1100B and thereby provide an additional translational d-o-f. In certain embodiments, a kinematic mechanism 400A may further be used to adjust the instrument 1100A and thereby provide an additional rotational d-o-f. In the description herein and in the figures, a combined kinematic mechanism 1000A refers to the kinematic mechanisms 100, 400A, and 500 assembled together.

In certain embodiments, a kinematic mechanism 400B may further be used to adjust the instrument 1100B and thereby provide an additional rotational d-o-f. In the description herein and in the figures, a combined kinematic mechanism 1000B refers to the kinematic mechanisms 100, 400B, and 500 assembled together.

In the description below and in the figures, kinematic bodies are defined and used to illustrate and describe the kinematic mechanisms 100, 400A, 400B, 500, 1000A, and 1000B and their interrelationships when they move with respect to each other.

A first kinematic body 10 may be connected/fixed to the ground and/or a base of the instrument 1100A, 1100B. In the example embodiments, the body 10 may include the end 102 of the joint 110. The kinematic mechanism 100 connects the body 10 to a second kinematic body 20. In the example embodiments, the body 20 may include the end 104 of the joint 110. As illustrated at FIGS. 13, 57, and 58, a one d-o-f prismatic joint 110 is used in the example embodiments to connect the first and second kinematic bodies 10, 20 and allow relative linear movement along a first axis A1, A1A, A1B. In other embodiments, other joints may be used.

As illustrated at FIG. 14, the kinematic mechanism 500 includes a kinematic mechanism 200 and a kinematic mechanism 300. The kinematic mechanism 200 is further illustrated at FIGS. 15 and 25-31, and the kinematic mechanism 300 is further illustrated at FIGS. 16 and 18-24. The kinematic mechanism 200 connects the body 20 to a third kinematic body 30. In the example embodiments, the body 20 may include the end 202 of the joint 210. As illustrated at FIGS. 27, 35-37, and 49-56, a two d-o-f cylindrical joint 210 is used in the example embodiments to connect the second and third kinematic bodies 20, 30 and allows relative linear and rotational movements along and about a second axis A2. In the example embodiments, the body 30 may include the end 204 of the joint 210. The kinematic mechanism 300 connects the body 30 to a fourth kinematic body 40. In the example embodiments, the body 30 may include the end 302 of the joint 310. As illustrated at FIGS. 18 and 38-48, a two d-o-f cylindrical joint 310 is used in the example embodiments to connect the third and fourth kinematic bodies 30, 40 and allow relative linear and rotational movements along and about a third axis A3. In the example embodiments, the body 40 may include the end 304 of the joint 310.

As illustrated at FIGS. 12 and 17, a fifth kinematic body 50 may be connected to the body 40 by a one d-o-f revolute joint (i.e., a pin joint) 410 and allow relative rotational movement about a first axis A1, A1A. In the example embodiments, the body 40 may include the end 402 of the joint 410. In the example embodiments, the body 50 may include the end 404 of the joint 410. As depicted at FIG. 6, the second object 52 may be mounted to the body 50. Alternatively or additionally as illustrated at FIGS. 8 and 9, a cylinder 482 of the first object 12 may be mounted in a bore 472 that is connected/fixed to the body 10 and thereby allow relative rotational movement about a first axis A1, A1B. An axial retainer 484 may further be used to form an alternate or additional one d-o-f revolute joint between the body 10 and a kinematic body 60.

Figure 59:
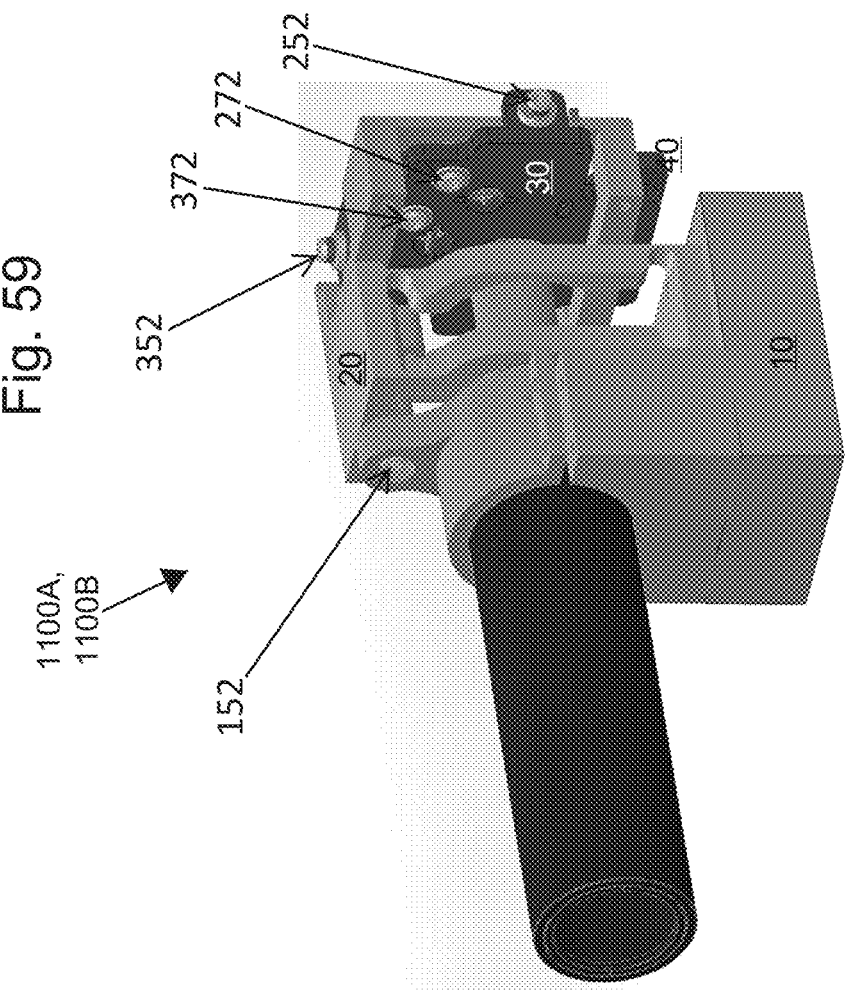
FIG. 59 is a perspective view of a generic instrument of FIGS. 1 and 2 mounted on the first and second kinematic mechanisms of FIGS. 13 and 14 and illustrates five adjusters for setting the kinematic mechanisms, in accordance with the principles of the present disclosure.
Figure 60:
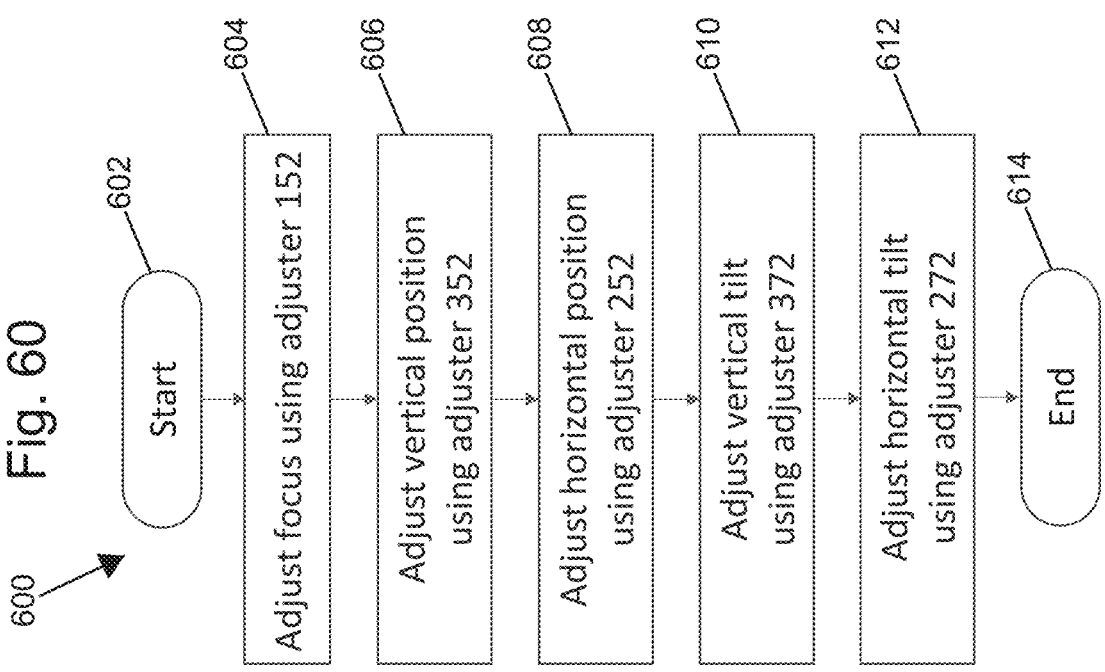
FIG. 60 is a flow chart of a method of adjusting the instrument of FIG. 59 with the five adjusters, in accordance with the principles of the present disclosure.

Turning now to FIG. 60, a method 600 of using the adjustable apparatus 1000A, 1000B to adjust the instrument 1100A, 1100B will be described according to the principles of the present disclosure with reference to FIG. 59. The method 600 begins at start 602 and proceeds to step 604 wherein a focus of the microscope 12 is adjusted by manipulating the adjuster 152. Upon step 604 being completed, step 606 is executed wherein a vertical position of the microscope 12 is adjusted using the adjuster 352. Upon step 606 being completed, step 608 is executed wherein a horizontal position of the microscope 12 is adjusted using the adjuster 252. Upon step 608 being completed, step 610 is executed wherein a vertical tilt of the microscope 12 is adjusted using the adjuster 372. Upon step 610 being completed, step 612 is executed wherein a horizontal tilt of the microscope 12 is adjusted using the adjuster 272. Upon the step 612 being completed, the method 600 is complete and an end 614 of the method 600 is reached.

Figure 61:
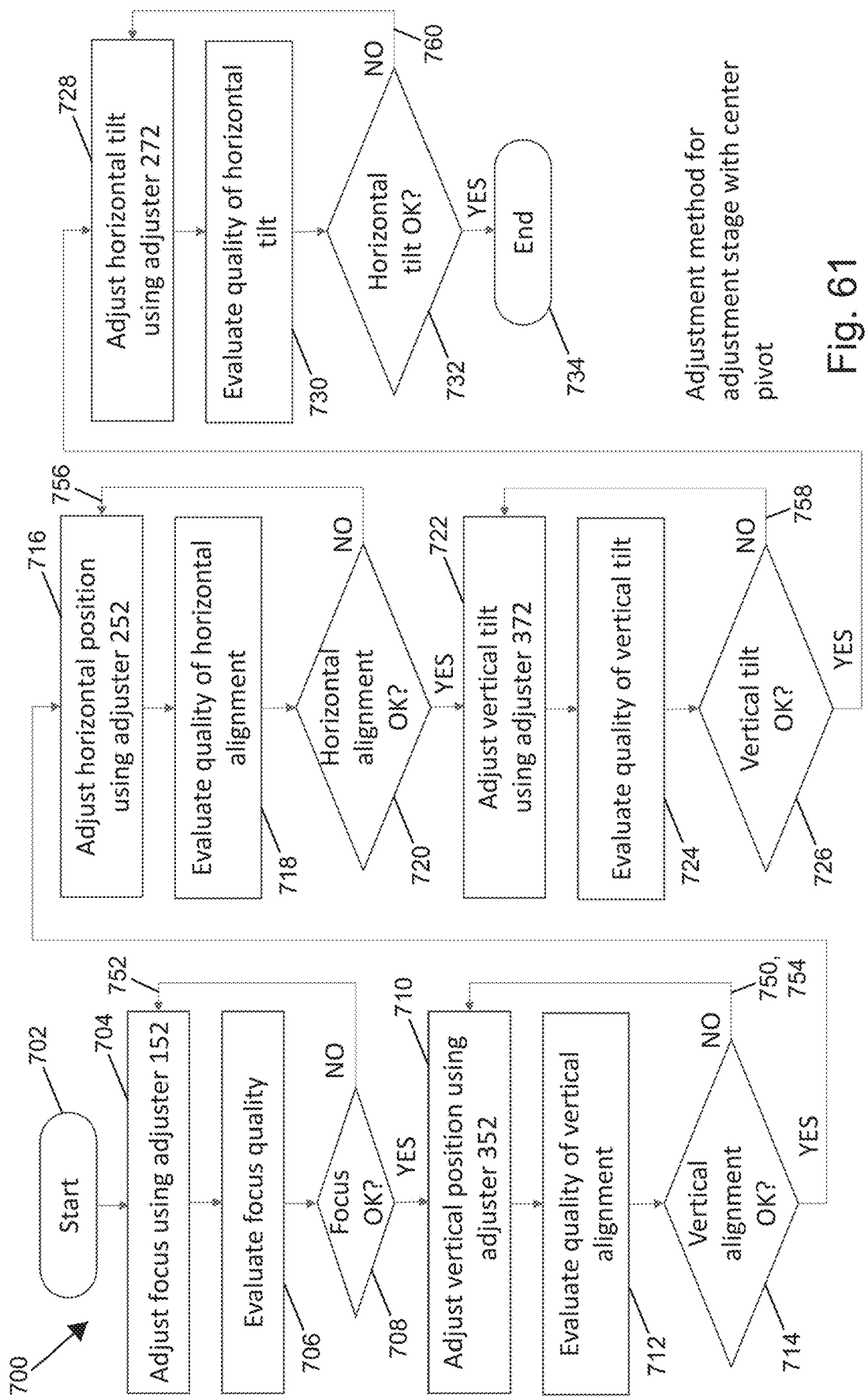
FIG. 61 is a flow chart of another method of adjusting the instrument of FIG. 59 with the five adjusters, in accordance with the principles of the present disclosure.

Turning now to FIG. 61, a method 700 of using the adjustable apparatus 1000A, 1000B to adjust the instrument 1100A, 1100B will be described according to the principles of the present disclosure with reference to FIG. 59. The method 700 begins at start 702 and proceeds to step 704 wherein a focus of the microscope 12 is adjusted by manipulating the adjuster 152. Upon step 704 being completed, step 706 is executed to evaluate a focus quality of step 704. Upon step 706 being completed, a decision point 708 is reached wherein if the focus quality is not acceptable, the method 700 returns to step 704 on loop 752, or if the focus quality is acceptable the method 700 proceeds to step 710. At step 710, a vertical position of the microscope 12 is adjusted using the adjuster 352. Upon step 710 being completed, step 712 is executed wherein a quality of the vertical alignment of step 710 is evaluated. Upon step 712 being completed, a decision point 714 is reached wherein if the vertical alignment is not acceptable, the method 700 returns to step 710 on loop 752, or if the vertical alignment is acceptable the method 700 proceeds to step 716. At step 716, a horizontal position of the microscope 12 is adjusted using the adjuster 252. Upon step 716 being completed, the method 700 proceeds to step 718 wherein a quality of the horizontal alignment of step 716 is evaluated. Upon step 718 being completed, a decision point 720 is reached wherein if the horizontal alignment is not acceptable, the method 700 returns to step 716 on loop 756, or if the horizontal alignment of the microscope 12 is acceptable, the method 700 proceeds to step 722. At step 722, a vertical tilt of the microscope 12 is adjusted using the adjuster 372. Upon step 722 being completed, the method 700 proceeds to step 724 wherein the quality of the vertical tilt adjustment of step 722 is evaluated. Upon step 724 being completed, a decision point 726 is reached wherein if the quality of the vertical tilt adjustment is not acceptable, the method 700 returns to step 722 on loop 758, or if the quality of the vertical tilt adjustment is acceptable, the method 700 proceeds to step 728. At step 728, the horizontal tilt of the microscope 12 is adjusted using the adjuster 272. Upon step 728 being completed, the method 700 proceeds to step 730 wherein the quality of the horizontal tilt adjustment of step 728 is evaluated. Upon step 730 being completed, a decision point 732 is reached wherein if the quality of the horizontal tilt is not acceptable, the method 700 returns to step 728 on loop 760, or if the quality of the horizontal tilt is acceptable, the method 700 is complete and an end 734 is reached. The loops 752, 754, 756, 758, and 760, collectively referred to as loops 750 are about a single process and do not iteratively involve multiple processes.

Figure 62:
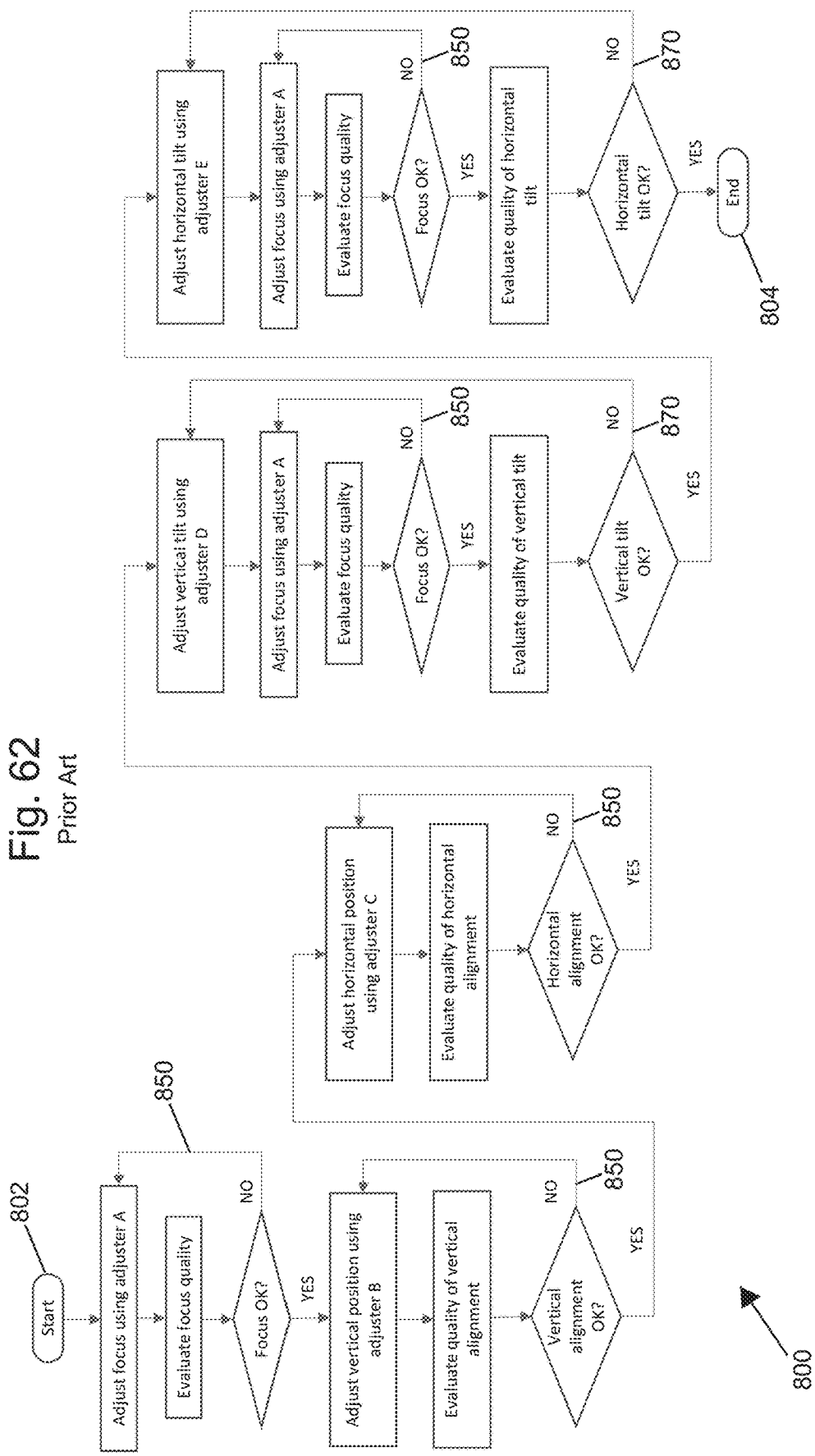
FIG. 62 is a flow chart of a method of adjusting certain prior art instruments with five adjusters.

Turning now to FIG. 62, a prior art method 800 of using a prior art adjustable apparatus to adjust a prior art instrument will now be described. The method 800 begins at start 802 and ends at end 804. The method includes several loops 850 about a single adjustment process and further includes several loops 870 iteratively about a plurality of adjustment processes. The prior art method 800 thereby describes a legacy alignment procedure which accommodates coupled movement in one or more tilt axes.

Figure 63:
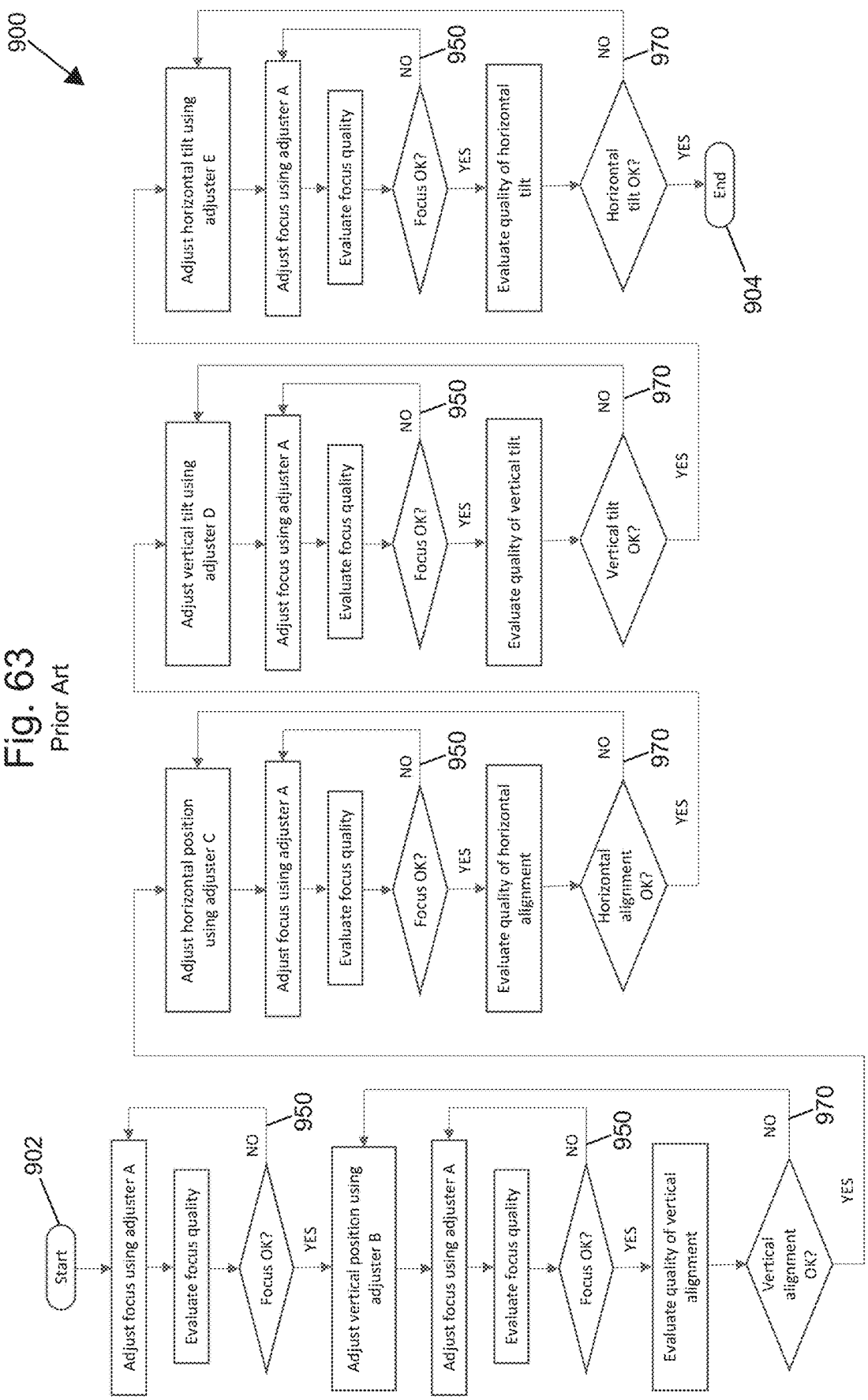
FIG. 63 is another flow chart of a method of adjusting certain prior art instruments with five adjusters.

Turning now to FIG. 63, a prior art method 900 of using a prior art adjustable apparatus to adjust a prior art instrument will be described. The method 900 begins at start 902 and ends at end 904. The method includes several loops 950 about a single adjustment process and further includes several loops 970 iteratively about a plurality of adjustment processes. The prior art method 900 thereby describes a legacy alignment procedure which accommodates coupled movement in one or more or all axes.

As depicted at FIGS. 5, 6, 9, 12, 35, 38, 41, 42, 44, 46, 48-50, 52, 54, and 56, the axes A1, A2, and A3 intersect with each other at the point P. Such a relationship between the axes A1, A2, and A3 may reduce or eliminate the need for the above-described loops 750, 850, and 950 (e.g., by substantially reducing or eliminating cross-coupling of the adjustments). Such a relationship between the axes A1, A2, and A3 may further reduce or eliminate the need for the above-described loops 870 and 970 (e.g., by substantially reducing or eliminating cross-coupling of the adjustments). As depicted at FIGS. 5 and 6, the point P may coincide or substantially coincide with the target location 54 of the second object 52. Such a relationship between the axes A1, A2, A3, and P and the target location 54 may reduce or eliminate the need for the above-described loops 750, 850, and 950 (e.g., by substantially reducing or eliminating cross-coupling of the adjustments). Such a relationship between the axes A1, A2, A3, and P and the target location 54 may reduce or eliminate the need for the above-described loops 870 and 970 (e.g., by substantially reducing or eliminating cross-coupling of the adjustments).

Figure 11:
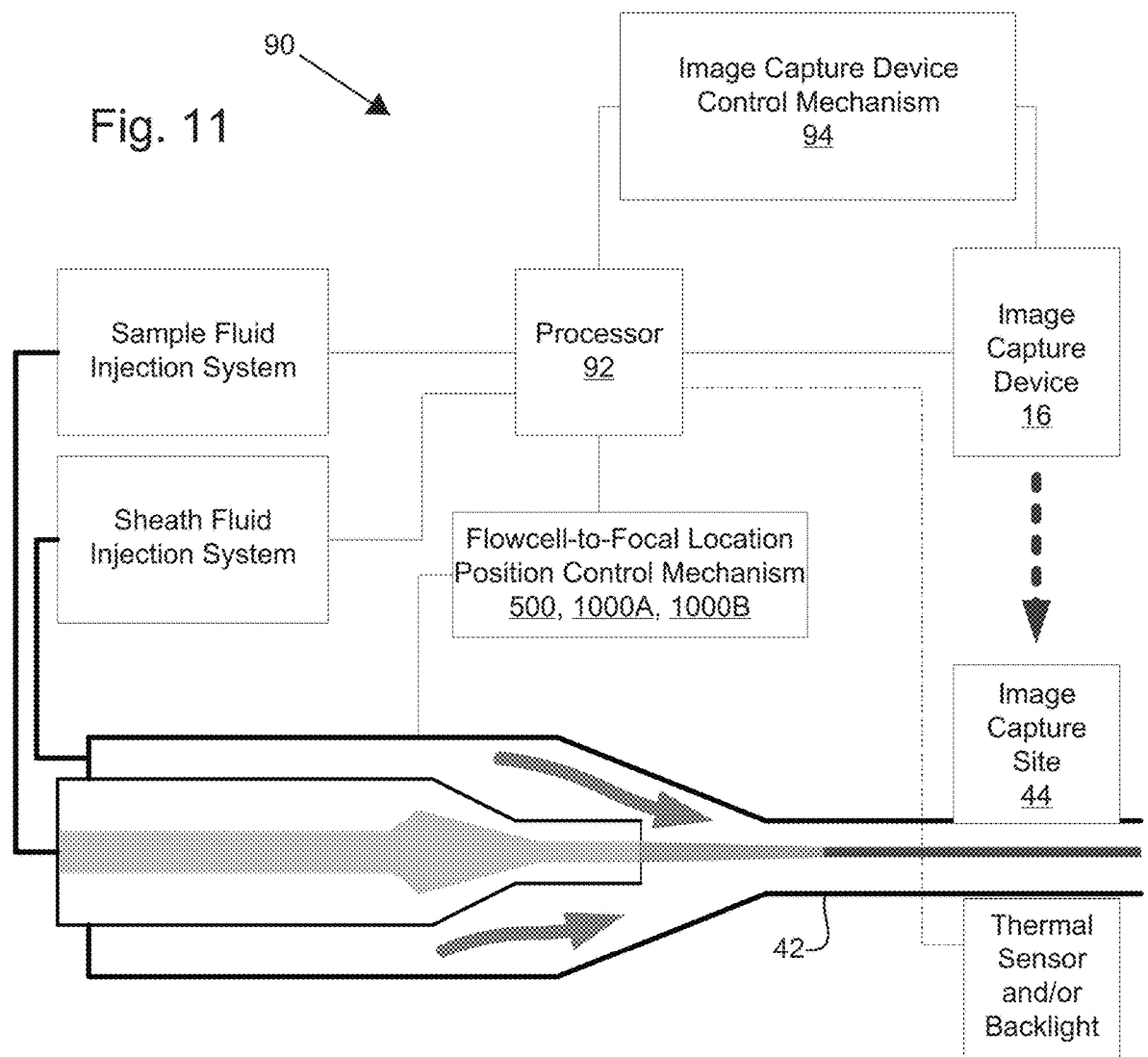
FIG. 11 is a schematic diagram illustrating operational aspects of the flow cell of FIG. 10.
Figure 10:
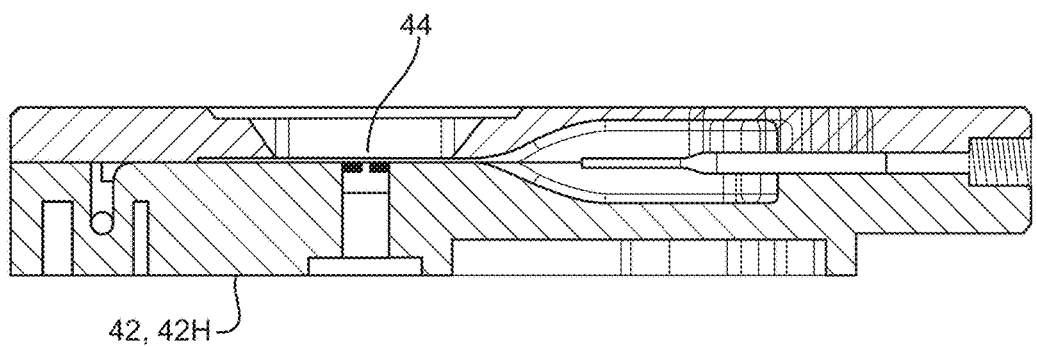
FIG. 10 is a cross-sectional longitudinal view of another flow cell compatible with the instrument of FIG. 2, in accordance with the principles of the present disclosure.

As schematically illustrated at FIG. 11, a control system 90 including a processor 92 and/or an image analyzer 94 may be included in certain embodiments to automate the adjustment of the adjustable apparatus 500, 1000A, 1000B (including automating the methods 600, 700).

From the foregoing it will be observed that numerous modifications and variations can be effectuated without departing from the true spirit and scope of the novel concepts of the present disclosure. It is to be understood that no limitation with respect to the specific embodiments illustrated is intended or should be inferred.

What is claimed is:

1. An apparatus configured to adjustably position a first body with respect to a second body, the apparatus comprising:
   the first body;
   the second body;
   a third body;
   a first joint configured to adjustably linearly position the first body with respect to the third body along a first axis and further configured to adjustably rotatably position the first body with respect to the third body about the first axis;
   a second joint configured to adjustably linearly position the second body with respect to the third body along a second axis and further configured to adjustably rotatably position the second body with respect to the third body about the second axis; and
   a third joint configured to linearly adjust and/or move the first body with respect to the second body along a third axis;
   wherein the first and second axes intersect each other at a point.

2. The apparatus of claim 1, wherein the first and second axes are orthogonal with each other.

3. The apparatus of claim 1, wherein the first axis of the first joint is defined between centers of a pair of spherical surfaces.

4. The apparatus of claim 3, wherein each of the spherical surfaces of the first joint respectively engages a pair of cylindrical surfaces of the first joint.

5. The apparatus of claim 1, wherein the second axis of the second joint is defined between centers of a pair of spherical surfaces.

6. The apparatus of claim 5, wherein each of the spherical surfaces of the second joint respectively engages a pair of cylindrical surfaces of the second joint.

7. The apparatus of claim 1, further comprising four actuators each configured to respectively independently linearly or rotatably adjust the first joint or the second joint.

8. The apparatus of claim 1, wherein the third joint includes at least two flexures.

9. The apparatus of claim 1, further comprising a fourth joint configured to rotatably adjust and/or move the first body with respect to the second body about the third axis.

10. The apparatus of claim 9, wherein all of the joints are zero backlash joints.

11. The apparatus of claim 9, wherein all of the joints are minimally constrained joints.

12. The apparatus of claim 9, wherein all of the joints are spring-loaded joints.

13. An apparatus configured to adjustably position a first body with respect to a second body, the apparatus comprising:
- the first body;
- the second body;
- a third body;
- a first joint configured to adjustably linearly position the first body with respect to the third body along a first axis and further configured to adjustably rotatably position the first body with respect to the third body about the first axis; and
- a second joint configured to adjustably linearly position the second body with respect to the third body along a second axis and further configured to adjustably rotatably position the second body with respect to the third body about the second axis;
- wherein the first and second axes intersect each other at a point;
- wherein the first axis of the first joint is defined between centers of a pair of spherical surfaces.

14. The apparatus of claim 13, wherein each of the spherical surfaces of the first joint respectively engages a pair of cylindrical surfaces of the first joint.

15. An apparatus configured to adjustably position a first body with respect to a second body, the apparatus comprising:
- the first body;
- the second body;
- a third body;
- a first joint configured to adjustably linearly position the first body with respect to the third body along a first axis and further configured to adjustably rotatably position the first body with respect to the third body about the first axis; and
- a second joint configured to adjustably linearly position the second body with respect to the third body along a second axis and further configured to adjustably rotatably position the second body with respect to the third body about the second axis;
- wherein the first and second axes intersect each other at a point;
- wherein the second axis of the second joint is defined between centers of a pair of spherical surfaces.

16. The apparatus of claim 15, wherein each of the spherical surfaces of the second joint respectively engages a pair of cylindrical surfaces of the second joint.

17. An apparatus configured to adjustably position a first body with respect to a second body, the apparatus comprising:
- the first body;
- the second body;
- a third body;
- a first joint configured to adjustably linearly position the first body with respect to the third body along a first axis and further configured to adjustably rotatably position the first body with respect to the third body about the first axis;
- a second joint configured to adjustably linearly position the second body with respect to the third body along a second axis and further configured to adjustably rotatably position the second body with respect to the third body about the second axis; and
- four actuators each configured to respectively independently linearly or rotatably adjust the first joint or the second joint;
- wherein the first and second axes intersect each other at a point.

* * * * *